United States Patent
Nakamura et al.

(10) Patent No.: US 7,680,572 B2
(45) Date of Patent: Mar. 16, 2010

(54) ONBOARD-EQUIPMENT CONTROL APPARATUS AND ONBOARD-EQUIPMENT CONTROL SYSTEM

(75) Inventors: Kazuo Nakamura, Obu (JP); Nobutaka Tauchi, Toyoake (JP)

(73) Assignee: DENSO CORPORATION, Kariya (JP)

( * ) Notice: Subject to any disclaimer, the term of this patent is extended or adjusted under 35 U.S.C. 154(b) by 536 days.

(21) Appl. No.: 11/108,793

(22) Filed: Apr. 19, 2005

(65) Prior Publication Data
US 2005/0234604 A1 Oct. 20, 2005

(30) Foreign Application Priority Data
Apr. 19, 2004 (JP) ............................ 2004-123093
Mar. 9, 2005 (JP) ............................ 2005-065736

(51) Int. Cl.
*G06F 7/00* (2006.01)
*G06F 17/00* (2006.01)

(52) U.S. Cl. ............... 701/36; 701/1; 701/2; 340/7.32; 340/7.33; 340/7.36; 340/7.37; 340/426.13; 340/426.14; 340/426.15; 340/426.16; 340/426.17; 340/539.1; 340/539.11; 340/539.16; 340/539.17; 340/539.19; 340/539.21; 340/539.22; 340/539.3; 455/92; 455/98; 455/99; 455/343.1; 455/343.2; 455/343.3; 455/343.4; 455/343.5; 455/345; 455/352

(58) Field of Classification Search ............... 701/1, 701/2, 36; 340/7.32–7.37, 426.13–426.17, 340/539.1, 539.11, 539.16, 539.17, 539.19, 340/539.21, 539.22, 539.3; 455/92, 98, 99, 455/343.1–352

See application file for complete search history.

(56) References Cited

U.S. PATENT DOCUMENTS

| 5,675,503 | A | * | 10/1997 | Moe et al. ................... 700/296 |
| 5,917,405 | A | * | 6/1999 | Joao ....................... 340/426.17 |
| 6,025,653 | A | * | 2/2000 | Hayashi et al. ................ 290/33 |
| 6,617,975 | B1 | * | 9/2003 | Burgess ................. 340/815.47 |
| 6,636,026 | B1 | * | 10/2003 | Nomoto ....................... 323/318 |
| 6,798,337 | B2 | * | 9/2004 | Onuma et al. .............. 340/5.72 |
| 6,952,156 | B2 | * | 10/2005 | Arshad et al. ................ 340/5.6 |

(Continued)

FOREIGN PATENT DOCUMENTS

| JP | A-6-147069 | 5/1994 |
| JP | A-9-21377 | 1/1997 |
| JP | A-2000-59867 | 2/2000 |
| JP | A-2002-078047 | 3/2002 |

*Primary Examiner*—Jack W. Keith
*Assistant Examiner*—Chuong P Nguyen
(74) *Attorney, Agent, or Firm*—Posz Law Group, PLC

(57) ABSTRACT

An onboard-equipment control apparatus controls activation of an onboard apparatus such as an air conditioner and termination of the operation of the onboard apparatus in order to prevent an onboard battery from running out of residual electric charge in advance. Upon detection of a state in which an onboard radio apparatus is not capable of receiving a termination command from a cellular phone or the cellular phone is not capable of transmitting a termination command to the onboard radio apparatus while the air conditioner is in operation, the onboard-equipment control apparatus forcibly terminates the operation of the air conditioner even before a termination condition is satisfied. Thus, the onboard battery can be prevented in advance from running out of accumulated electric charge required for operating the activated air conditioner thereafter.

33 Claims, 12 Drawing Sheets

U.S. PATENT DOCUMENTS 6,967,695 B2 * 11/2005 Hoshino et al. ............. 348/734
7,050,838 B1 * 5/2006 Muramatsu et al. ...... 455/556.1
7,055,340 B2 * 6/2006 Umebayashi et al. ......... 62/244
2002/0023237 A1 * 2/2002 Yamada et al. .............. 713/323
2004/0093127 A1 * 5/2004 Onoyama et al. .............. 701/1
2006/0238316 A1 * 10/2006 Taki et al. .............. 340/426.13

* cited by examiner

ONBOARD-EQUIPMENT CONTROL APPARATUS AND ONBOARD-EQUIPMENT CONTROL SYSTEM

CROSS REFERENCE TO RELATED APPLICATIONS

This application is based upon, claims the benefit of priority of, and incorporates by reference the contents of, Japanese Patent Application No. 2004-123093 filed on Apr. 19, 2004 and Japanese Patent Application No. 2005-65736 filed on Mar. 9, 2005.

FIELD OF THE INVENTION

The present invention relates to an onboard-equipment control apparatus for controlling activation and termination of an onboard apparatus such as a vehicle air conditioner driven to operate by power supplied from a vehicle battery as operation-driving power, and relates to an onboard-equipment control system comprising the onboard-equipment control apparatus and a center apparatus.

BACKGROUND OF THE INVENTION

Traditionally, in some cases, activation and termination of a home electronic apparatus installed in a house is controlled by remote operations requested by respectively activation and termination commands received from a remote control device as commands to activate the home electronic apparatus and terminate the operation of the home electronic apparatus as described in documents such as the following patent references:

Patent reference 1: JP-2000-59867A

Patent reference 2: JP-2002-78047A

An example of the remote operations is reservation of video recording of a TV program in a video deck.

In the remote control executed as described above to activate and terminate a home electronic apparatus, normally, the home electronic apparatus is activated and driven by power supplied from a commercial power supply through a commercial plug as operation-driving power. Thus, the power consumption of the home electronic apparatus has a negligible effect on other apparatus.

In a parked vehicle, on the other hand, in order to keep the inside of a vehicle at a proper temperature at a time the user gets in the vehicle in advance, for example, a technique is devised to automatically activate an onboard air conditioner at an activation time set in advance by the user. An air conditioner activated automatically in this way may conceivably be terminated when the user gets in the vehicle or when the user returns to the vehicle. When long time lapses before the user gets in the vehicle or before the user returns to the vehicle, however, the actual temperature of the inside of the vehicle may become much different from a set temperature, and such a big difference due to the lapse of the long time actually entails a large load borne by the air conditioner. Such a large load in turn increases the power consumption of the air conditioner. Since the air conditioner is driven to operate by power supplied as operation-driving power from an onboard vehicle battery having limited accumulated electric charge, it is likely that the battery will run out of accumulated electric charge.

In order to solve the problem, a configuration is conceived as a measure for coping with such a situation. In the conceived configuration, the operation of the air conditioner is forcibly terminated on condition that an onboard radio apparatus has received a command to terminate the operation of the onboard apparatus from a remote control apparatus. In such a configuration, by giving a command to terminate the operation of the onboard apparatus to the onboard radio apparatus from the remote control apparatus, the operation of the air conditioner can be terminated forcibly even when the user does not get in the vehicle or the user does not return to the vehicle. Thus, the possibility that the onboard battery will run out of accumulated electric charge can be avoided in advance.

In the configuration described above, however, it is assumed that the onboard radio apparatus is capable of receiving a command to terminate the operation of the onboard apparatus from the remote control apparatus and that the remote control apparatus is capable of transmitting a command to terminate the operation of the onboard apparatus to the onboard radio apparatus. When the onboard radio apparatus is not capable of receiving a command to terminate the operation of the onboard apparatus from the remote control apparatus or the remote control apparatus is not capable of transmitting a command to terminate the operation of the onboard apparatus to the onboard radio apparatus, however, it is difficult to forcibly terminate the operation of the air conditioner. As a result, the configuration raises a problem of putting the user in a difficult situation such as a situation in which the onboard battery runs out of accumulated electric charge, the engine cannot be started and/or a theft notification signal cannot be transmitted to a central office.

SUMMARY OF THE INVENTION

It is thus an object of the present invention addressing the situations described above to provide an onboard-equipment control apparatus capable of properly controlling activation and termination of an onboard apparatus such as an onboard air conditioner and, hence, capable of preventing the onboard battery from running out of accumulated electric charge in advance and, thus, capable of preventing the user from being put in a difficult situation in advance even when the onboard radio apparatus is not capable of receiving a command to terminate the operation of the onboard apparatus from the remote control apparatus or the remote control apparatus is not capable of transmitting a command to terminate the operation of the onboard apparatus to the onboard radio apparatus.

In accordance with an onboard-equipment control apparatus of a first aspect, upon detection of the fact that a radio communication means is no longer capable of receiving a command to terminate the operation of an onboard apparatus from a remote control apparatus or the remote control apparatus is no longer capable of transmitting a command to terminate the operation of the onboard apparatus to the radio communication means while an onboard apparatus is in operation, a control means executes control to terminate the operation of the onboard apparatus even before a condition for termination of the operation of the onboard apparatus is satisfied.

As described above, with a radio communication means becoming incapable of receiving a command to terminate the operation of the onboard apparatus from a remote control apparatus or the remote control apparatus becoming incapable of transmitting a command to terminate the operation of the onboard apparatus to the radio communication means in the course of the operation of an onboard apparatus, a control means executes control to forcibly terminate the operation of the onboard apparatus even before a condition for termination of the operation of the onboard apparatus is satisfied. Thus, an onboard battery can be prevented in advance from running out of accumulated electric charge required for continuing the operation of the onboard apparatus thereafter. As a result, the user can be prevented in advance from being put in a difficult situation.

In accordance with an onboard-equipment control apparatus of a second aspect, upon detection of the fact that a radio communication means is no longer capable of receiving a command to terminate the operation of an onboard apparatus from a remote control apparatus or the remote control apparatus is no longer capable of transmitting a command to terminate the operation of the onboard apparatus to the radio communication means, a control means executes control to inhibit activation of the onboard apparatus even after a condition for activation of the onboard apparatus has been satisfied.

As described above, when the radio communication means is no longer capable of receiving a command to terminate the operation of the onboard apparatus from the remote control apparatus or the remote control apparatus is no longer capable of transmitting a command to terminate the operation of the onboard apparatus to the radio communication means, the control means executes control to inhibit activation of an onboard apparatus even after a condition for activation of the onboard apparatus has been satisfied. Thus, an onboard battery can be prevented in advance from running out of accumulated electric charge required for continuing the operation of the onboard apparatus thereafter. As a result, the user can be prevented in advance from being put in a difficult situation.

In accordance with an onboard-equipment control apparatus of a third aspect, a control means determines that a radio communication means is no longer capable of receiving a command to terminate the operation of an onboard apparatus from a remote control apparatus when the number of events detected per time unit as events in each of which the level of a reception electrical field at the radio communication means is lower than a predetermined level reaches a predetermined event count. In this way, the control means can be prevented from mistakenly determining that the radio communication means is no longer capable of receiving a command to terminate the operation of the onboard apparatus from the remote control apparatus only because the level of a reception electrical field at the radio communication means is lower than the predetermined level instantaneously due to, for example, the fact that an electric-wave environment at the location of the onboard-equipment control apparatus changes instantaneously. Thus, it is possible to precisely determine whether or not the radio communication means is capable of receiving a command to terminate the operation of the onboard apparatus from the remote control apparatus. As a result, incorrect determination can be avoided.

In accordance with an onboard-equipment control apparatus of a fourth aspect, a control means determines that a radio communication means is no longer capable of receiving a command to terminate the operation of an onboard apparatus from a remote control apparatus when an instance in which the level of a reception electrical field at the radio communication means is lower than a predetermined level has been continuing for a predetermined period of time. In this way, much like the onboard-equipment control apparatus described in the third aspect, the control means can be prevented from mistakenly determining that the radio communication means is no longer capable of receiving a command to terminate the operation of the onboard apparatus from the remote control apparatus only because the level of a reception electrical field at the radio communication means is lower than the predetermined level instantaneously due to, for example, the fact that an electric-wave environment at the location of the onboard-equipment control apparatus changes instantaneously. Thus, it is possible to precisely determine whether or not the radio communication means is capable of receiving a command to terminate the operation of the onboard apparatus from the remote control apparatus. As a result, incorrect determination can be avoided.

In accordance with an onboard-equipment control apparatus of a fifth aspect, a control means determines that a radio communication means is no longer capable of receiving a command to terminate the operation of an onboard apparatus from a remote control apparatus when a failure of the radio communication means is detected. Thus, it is possible to determine whether or not a radio communication means is no longer capable of receiving a command to terminate the operation of the onboard apparatus from a remote control apparatus based on whether or not a failure of the radio communication means is detected.

In accordance with an onboard-equipment control apparatus of a sixth embodiment, a control means determines that a remote control apparatus is no longer capable of transmitting a command to terminate the operation of an onboard apparatus to a radio communication means when the number of events detected per time unit as events in each of which the level of a reception electrical field at the remote control apparatus is lower than a predetermined level reaches a predetermined event count. In this way, the control means can be prevented from mistakenly determining that the remote control apparatus is no longer capable of transmitting a command to terminate the operation of the onboard apparatus to the radio communication means only because the level of a reception electrical field at the remote control apparatus is lower than the predetermined level instantaneously due to, for example, the fact that an electric-wave environment at the location of the remote control apparatus changes instantaneously. Thus, it is possible to precisely determine whether or not the remote control apparatus is capable of transmitting a command to terminate the operation of the onboard apparatus to the radio communication means. As a result, incorrect determination can be avoided.

In accordance with an onboard-equipment control apparatus of a seventh aspect, a control means determines that a remote control apparatus is no longer capable of transmitting a command to terminate the operation of the onboard apparatus to a radio communication means when an instance in which the level of a reception electrical field at the remote control apparatus is lower than a predetermined level has been continuing for a predetermined period of time. In this way, much like the onboard-equipment control apparatus of the sixth aspect, the control means can be prevented from mistakenly determining that the remote control apparatus is no longer capable of transmitting a command to terminate the operation of the onboard apparatus to the radio communication means only because the level of a reception electrical field at the remote control apparatus is lower than the predetermined level instantaneously due to, for example, the fact that an electric-wave environment at the location of the remote control apparatus changes instantaneously. Thus, it is possible to precisely determine whether or not the remote control apparatus is no longer capable of transmitting a command to terminate the operation of the onboard apparatus to the radio communication means. As a result, incorrect determination can be avoided.

In accordance with an onboard-equipment control apparatus of an eighth aspect, a battery residual electric charge inference means infers the amount of residual electric charge left in an onboard battery and a power-consumption inference means infers a power consumption representing the amount of power consumed by an onboard apparatus on the assumption that the operation of the onboard apparatus is terminated when a condition for termination of the operation of the onboard apparatus is satisfied. A control means executes control to terminate the operation of the onboard apparatus even before the condition for termination of the operation of the onboard apparatus is satisfied when a difference between a residual electric charge amount inferred by the battery residual electric charge inference means as the amount of residual electric charge left in the onboard battery and the power consumption inferred by the power-consumption inference means is found not greater than a predetermined value.

As described above, when the difference between the amount of residual electric charge left in the onboard battery and power consumption inferred as the amount of power consumed by the onboard apparatus on the assumption that the operation of the onboard apparatus is terminated when a condition for termination of the operation of the onboard apparatus is satisfied, is found not greater than the predetermined value while the onboard apparatus is in operation, the control means executes control to forcibly terminate the operation of the onboard apparatus even before the condition for termination of the operation of the onboard apparatus is satisfied. Thus, much like the onboard-equipment control apparatus of the first aspect, the onboard battery can be prevented in advance from running out of accumulated electric charge required for continuing the operation of the onboard apparatus thereafter. As a result, the user can be prevented in advance from being put in a difficult situation. It is to be noted that the predetermined value is arbitrarily set by the user or a person in charge of maintenance/application in the car manufacturer. The predetermined value can be any arbitrary value as long as the value at least assures activation requested by the user. For example, the predetermined value corresponds to the amount of battery charge required for starting the engine once or the amount of battery charge required for transmitting a theft notification signal to a central office for handling car thefts.

In accordance with an onboard-equipment control apparatus of a ninth aspect, a control means executes control to transmit a termination notification signal from a radio communication means to a remote control apparatus by way of a radio communication network after terminating the operation of an onboard apparatus as a signal informing the remote control apparatus that the operation of the onboard apparatus has been terminated. Thus, the control means is capable of executing control to inform the remote control apparatus that the operation of the onboard apparatus has been terminated forcibly due to the fact that the difference between the amount of residual electric charge left in the onboard battery and power consumption inferred as the amount of power consumed by the onboard apparatus is found not greater than the predetermined value.

In accordance with an onboard-equipment control apparatus described of a tenth aspect, a battery residual electric charge inference means infers the amount of residual electric charge left in an onboard battery and a power-consumption inference means infers a power consumption representing the amount of power consumed by an onboard apparatus on the assumption that the operation of the onboard apparatus is terminated when a condition for termination of the operation of the onboard apparatus is satisfied after the activation of the onboard apparatus. A control means executes control to inhibit activation of an onboard apparatus even after a condition for activation of the onboard apparatus has been satisfied when a difference between a residual electric charge amount inferred by the battery residual electric charge inference means as the amount of residual electric charge left in the onboard battery and the power consumption inferred by the power-consumption inference means is found not greater than a predetermined value.

As described above, when the difference between the amount of residual electric charge left in the onboard battery and power consumption inferred as the amount of power consumed by the onboard apparatus, on the assumption that the operation of the onboard apparatus is terminated after the activation of the onboard apparatus when a condition for termination of the operation of the onboard apparatus is satisfied, is found not greater than the predetermined value while the onboard apparatus is in operation, the control means executes control to forcibly inhibit the activation of the onboard apparatus, that is, control to prevent the onboard apparatus from being activated, even after a condition for activation of the onboard apparatus has been satisfied. Thus, much like the onboard-equipment control apparatus described in the second aspect, an onboard battery can be prevented in advance from running out of accumulated electric charge required for continuing the operation of the onboard apparatus thereafter. As a result, the user can be prevented in advance from being put in a difficult situation. Also in this case, the predetermined value can be any arbitrary value as long as the value at least assures activation requested by the user. For example, the predetermined value corresponds to the amount of battery charge required for starting the engine once or the amount of battery charge required for transmitting a theft notification signal to a central office for handling car thefts.

In accordance with an onboard-equipment control apparatus of an eleventh aspect, after execution of control to inhibit activation of an onboard apparatus, a control means executes control to transmit an activation-inhibition notification signal from a radio communication means to a remote control apparatus by way of a radio communication network as a signal informing the remote control apparatus that the activation of the onboard apparatus in operation has been inhibited. Thus, when a difference between the amount of residual power left in an onboard battery for storing operation-driving power for driving the onboard apparatus and a power consumption is not greater than a predetermined value, the control means is capable of informing the remote control apparatus that the activation of the onboard apparatus in operation has been inhibited forcibly.

In accordance with an onboard-equipment control apparatus of a twelfth aspect, a control means executes control to activate an onboard apparatus when a difference between a residual electric charge amount inferred by a battery residual electric charge inference means as the amount of residual electric charge left in an onboard battery and a power consumption inferred by a power-consumption inference means is found at least equal to a predetermined value after a condition for activation of the onboard apparatus is satisfied. Thus, the onboard apparatus can be activated normally after the condition for activation of the onboard apparatus is satisfied when the difference between the amount of residual electric charge left in the onboard battery for the onboard apparatus and the amount of power, which is consumed by the onboard apparatus on the assumption that the operation of the onboard apparatus is terminated upon satisfaction of a condition for termination of the operation of the onboard apparatus after activation of the onboard apparatus, upon satisfaction of the condition for activation of the onboard apparatus.

In accordance with an onboard-equipment control apparatus of a thirteenth aspect as an onboard-equipment control apparatus provided for a vehicle, a control means compares the present position of the vehicle with map data in order to determine whether or not the vehicle is located in an area with a poor environment for electric waves and, when the vehicle is located in an area with a poor environment for electric waves, the control means executes control to inhibit activation of an onboard apparatus even after a condition for activation of the onboard apparatus is satisfied. Thus, when the vehicle is located in an area registered in advance in map data as an area with a poor environment for electric waves, the control means executes control to forcibly inhibit the activation of the onboard apparatus, that is, control to prevent the onboard apparatus from being activated. As a result, much like the onboard-equipment control apparatus of the second aspect, an onboard battery can be prevented in advance from running out of accumulated electric charge required for continuing the operation of the onboard apparatus thereafter and, hence, the user can be prevented in advance from being put in a difficult situation.

In accordance with an onboard-equipment control apparatus of a fourteenth aspect as an onboard-equipment control apparatus provided for a vehicle, a control means compares position information received from a navigation apparatus as the present position of the vehicle with map data used in the navigation apparatus in order to determine whether or not the vehicle is located in an area with a poor environment for electric waves. By utilizing the map data used in the navigation apparatus in this way, the control means is capable of determining whether or not the vehicle is located in an area with a poor environment for electric waves. In addition, the map data used in the navigation apparatus can be utilized in an effective manner.

In accordance with an onboard-equipment control apparatus of a fifteenth aspect as an onboard-equipment control apparatus provided for a vehicle, a control means compares position information received from a navigation apparatus as the present position of the vehicle with map data supplied by a map-data distribution apparatus by way of a radio communication network in order to determine whether or not the vehicle is located in an area with a poor environment for electric waves. Thus, by receiving map data transmitted by the map-data distribution apparatus by way of a radio communication network, the control means is capable of determining whether or not the vehicle is located in an area with a poor environment for electric waves based on the map data received from the map-data distribution apparatus by way of a radio communication network even when the navigation apparatus does not hold such map data.

In accordance with an onboard-equipment control apparatus of a sixteenth aspect, after a control means executes control to terminate the operation of an onboard apparatus upon detection of the fact that a radio communication means is no longer capable of receiving a command to terminate the operation of the onboard apparatus from a remote control apparatus, the control means executes control to resume the operation of the terminated onboard apparatus upon detection of a recovery of the radio communication means from a state of being incapable of receiving a command to terminate the operation of the onboard apparatus from the remote control apparatus to a state of being again capable of receiving a command to terminate the operation of the onboard apparatus from the remote control apparatus. Thus, upon detection of a recovery of the radio communication means from a state of being incapable of receiving a command to terminate the operation of the onboard apparatus from the remote control apparatus to a state of being again capable of receiving a command to terminate the operation of the onboard apparatus from the remote control apparatus, the control means is capable of executing control to restore the onboard apparatus to a state prior to the termination of the operation of an onboard apparatus.

In accordance with an onboard-equipment control apparatus of a seventeenth aspect, after a control means executes control to terminate the operation of an onboard apparatus upon detection of the fact that a remote control apparatus is no longer capable of transmitting a command to terminate the operation of the onboard apparatus to a radio communication means, the control means executes control to resume the operation of the terminated onboard apparatus upon detection of a recovery of the remote control apparatus from a state of being incapable of transmitting a command to terminate the operation of the onboard apparatus to the radio communication means to a state of being again capable of transmitting a command to terminate the operation of the onboard apparatus to the radio communication means. Thus, upon detection of a recovery of the remote control apparatus from a state of being incapable of transmitting a command to terminate the operation of the onboard apparatus to the radio communication means to a state of being again capable of transmitting a command to terminate the operation of the onboard apparatus to the radio communication means, the control means is capable of executing control to restore the onboard apparatus to a state prior to the termination of the operation of an onboard apparatus in the same way as the onboard-equipment control apparatus of the fifteenth aspect.

In accordance with an onboard-equipment control apparatus of an eighteenth aspect, a stopped onboard apparatus is reactivated provided that a predetermined condition is satisfied. Thus, the stopped onboard apparatus can be returned to a state prior to termination for example only when the user allows resumption of the operation of the stopped onboard apparatus.

In accordance with an onboard-equipment control apparatus of a nineteenth aspect, after execution of control to resume the operation of a stopped onboard apparatus, a control means executes control to transmit a resumption notification signal to a remote control apparatus from a radio communication means by way of a radio communication network as a signal informing the remote control apparatus that the operation of the stopped onboard apparatus has been resumed. In this way, the remote control apparatus can be notified of the resumption of the operation of the stopped onboard apparatus.

In accordance with an onboard-equipment control apparatus of a twentieth aspect, after a control means executes control to inhibit activation of a pre-activation onboard apparatus upon detection of the fact that a radio communication means is no longer capable of receiving a command to terminate the operation of an onboard apparatus from a remote control apparatus, the control means executes control to terminate the inhibited-activation state of the pre-activation onboard apparatus upon detection of a recovery of the radio communication means from a state of being incapable of receiving a command to terminate the operation of the onboard apparatus from the remote control apparatus to a state of being again capable of receiving a command to terminate the operation of the onboard apparatus from the remote control apparatus. Thus, upon detection of a recovery of the radio communication means from a state of being incapable of receiving a command to terminate the operation of the onboard apparatus from the remote control apparatus to a state of being again capable of receiving a command to terminate the operation of the onboard apparatus from the remote control apparatus, the control means is capable of executing control to resume the operation of the onboard apparatus after a condition for activation of the onboard apparatus is satisfied.

In accordance with an onboard-equipment control apparatus of a twenty-first aspect, after a control means executes control to inhibit activation of a pre-activation onboard apparatus upon detection of the fact that a remote control apparatus is no longer capable of transmitting a command to terminate the operation of the onboard apparatus to a radio communication means, the control means executes control to terminate the inhibited-activation state of the pre-activation onboard apparatus upon detection of a recovery of the remote control apparatus from a state of being incapable of transmitting a command to terminate the operation of the onboard apparatus to the radio communication means to a state of being again capable of transmitting a command to terminate the operation of the onboard apparatus to the radio communication means. Thus, upon detection of a recovery of the remote control apparatus from a state of being incapable of transmitting a command to terminate the operation of the onboard apparatus to the radio communication means to a state of being again capable of transmitting a command to terminate the operation of the onboard apparatus to the radio communication means, the control means is capable of executing control to resume the operation of the onboard apparatus after a condition for activation of the onboard apparatus is satisfied in the same way as the onboard-equipment control apparatus of the twentieth aspect.

In accordance with an onboard-equipment control apparatus of the twenty-second aspect, a control means executes control to terminate an inhibited-activation state of a pre-activation onboard apparatus provided that a predetermined condition is satisfied. Thus, when the predetermined condition is satisfied, the operation of the onboard apparatus can be activated for example only when the user allows the termination of the inhibited-activation state of the onboard apparatus.

In accordance with an onboard-equipment control apparatus of a twenty-third aspect, after execution of control to terminate an inhibited-activation state of a pre-activation onboard apparatus, a control means executes control to transmit an activation-inhibition termination signal to a remote control apparatus from a radio communication means by way of a radio communication network as a signal informing the remote control apparatus that the inhibited-activation state of the stopped onboard apparatus has been ended. In this way, the remote control apparatus can be notified of the termination of the inhibited-activation state of the stopped onboard apparatus.

In accordance with an onboard-equipment control system of a twenty-fourth aspect, upon detection of the fact that a remote control apparatus is no longer capable of transmitting a command to terminate the operation of an onboard apparatus to an onboard-equipment control apparatus while the onboard apparatus is in operation, a center apparatus transmits a command to forcibly terminate the operation of the onboard apparatus to the onboard-equipment control apparatus and, upon detection of the fact that the command to forcibly terminate the operation of the onboard apparatus has been received from the center apparatus, the onboard-equipment control apparatus terminates the operation of the onboard apparatus.

As described above, the onboard-equipment control apparatus forcibly terminates the operation of the onboard apparatus even before a condition for termination of the operation of the onboard apparatus is satisfied when a command to forcibly terminate the operation of the onboard apparatus is received from the center apparatus while the onboard apparatus is in operation. Thus, much like the effects of the onboard-equipment control apparatus of the first aspect, an onboard battery can be prevented in advance from running out of accumulated electric charge required for continuing the operation of the onboard apparatus thereafter. As a result, the user can be prevented in advance from being put in a difficult situation.

In accordance with an onboard-equipment control system of a twenty-fifth aspect, upon detection of the fact that a remote control apparatus is no longer capable of transmitting a command to terminate the operation of an onboard apparatus to an onboard-equipment control apparatus while the onboard apparatus is in operation, a center apparatus transmits a forcible activation inhibition command to the onboard-equipment control apparatus and, upon detection of the fact that the forcible activation inhibition command has been received from the center apparatus, the onboard-equipment control apparatus inhibits the activation of the operation of the onboard apparatus even after a condition for activation of the onboard apparatus has been satisfied.

As described above, the onboard-equipment control apparatus forcibly inhibits the activation of the onboard apparatus in operation even after a condition for activation of the onboard apparatus has been satisfied when a forcible activation inhibition command is received from the center apparatus while the onboard apparatus is in operation. Thus, much like the effects of the onboard-equipment control apparatus of the second aspect, an onboard battery can be prevented in advance from running out of accumulated electric charge required for continuing the operation of the onboard apparatus thereafter. As a result, the user can be prevented in advance from being put in a difficult situation.

BRIEF DESCRIPTION OF THE DRAWINGS

The above and other objects, features and advantages of the present invention will become more apparent from the following detailed description made with reference to the accompanying drawings.

DETAILED DESCRIPTION OF THE PREFERRED EMBODIMENTS

First Embodiment

Figure 1:
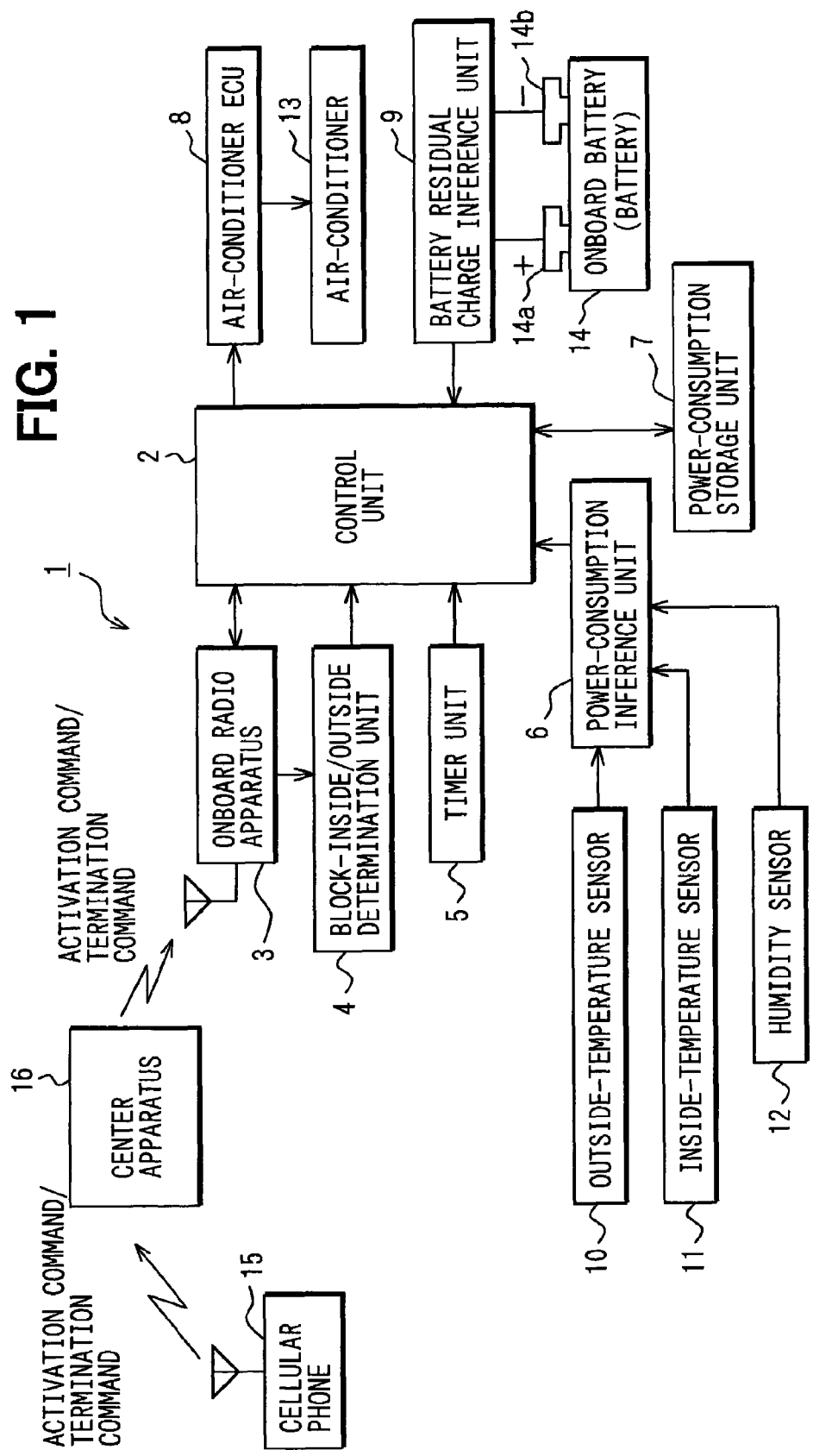
FIG. 1 is a functional block diagram showing the configuration of an onboard-equipment control system according to a first embodiment of the present invention.
Figure 2:
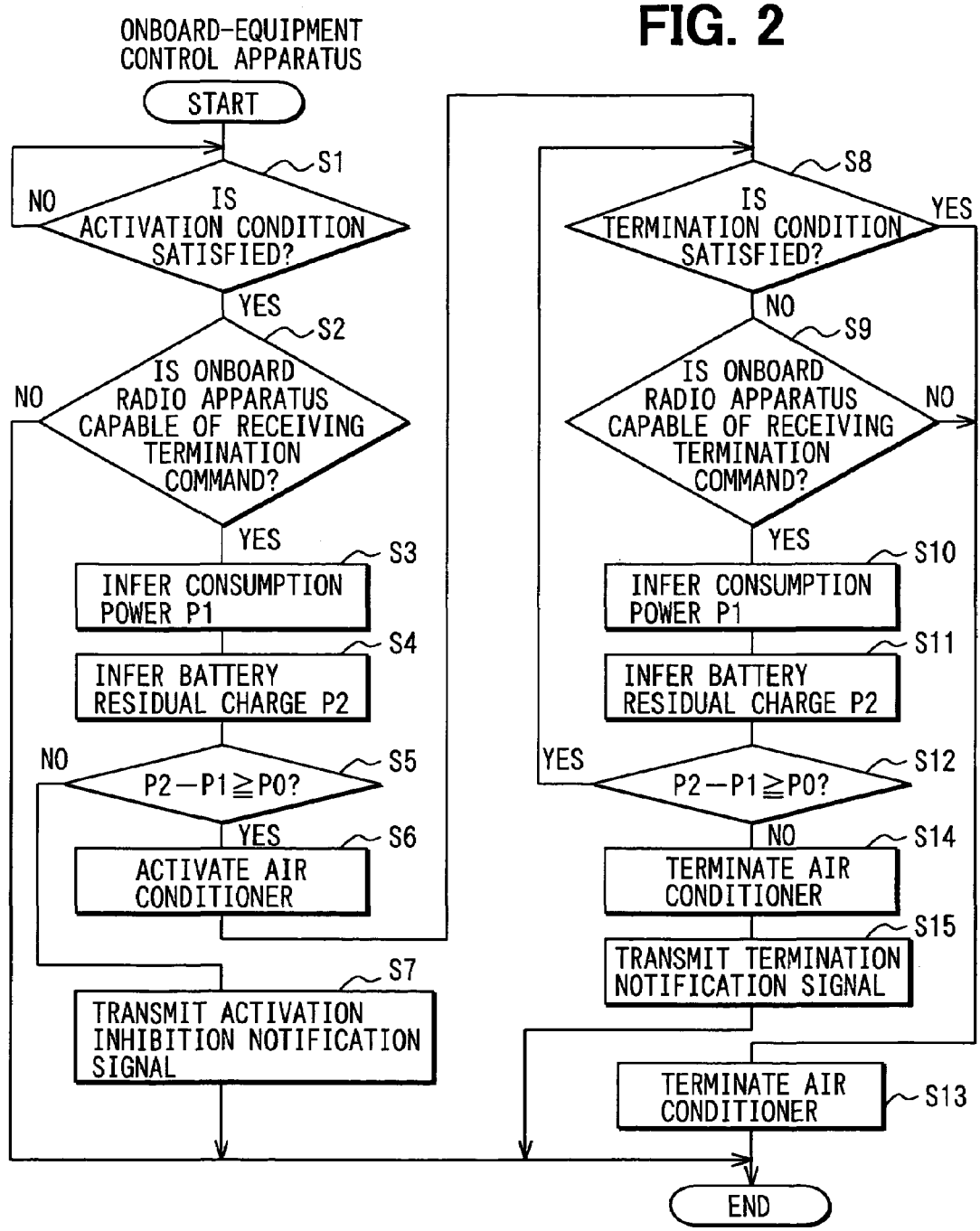
FIG. 2 shows a flowchart representing processing carried out by an onboard-equipment control apparatus employed in the onboard-equipment control system shown in FIG. 1.

By referring to FIGS. 1 and 2, the following description explains a first embodiment applying the present invention to an onboard-equipment control apparatus for controlling activation of an onboard air conditioner and termination of the operation of the onboard air conditioner serving as an onboard apparatus. The onboard air conditioner is referred to hereafter simply as an air conditioner. First of all, FIG. 1 is given as a functional block diagram showing the configuration of the onboard-equipment control system. Mounted in a vehicle, the onboard-equipment control apparatus 1 comprises a control unit 2 (a control means provided by the present invention) an onboard radio apparatus 3 (a radio communication means provided by the present invention), a block-inside/block-outside determination unit 4, a timer unit 5, a power-consumption inference unit 6 (a power-consumption inference means provided by the present invention), a power-consumption storage unit 7, an air-conditioner ECU 8 and a battery residual charge inference unit 9 (a battery residual charge inference means provided by the present invention) as shown in the figure.

The control unit 2 comprises a CPU, a RAM, a ROM and an I/O bus. The control unit 2 is a component for executing programs to control all operations of the onboard-equipment control apparatus 1. The onboard radio apparatus 3 is a component for carrying out communications with a cellular phone 15 (a remote control apparatus provided by the present invention) through a hand-phone network (including a center apparatus 16). In this embodiment, the onboard radio apparatus 3 receives commands transmitted by the cellular phone 15 by way of the hand-phone network as a command to activate the air conditioner 13 and a command to terminate the operation of the air conditioner 13. The block-inside/block-outside determination unit 4 is a component for determining whether the onboard-equipment control apparatus 1 (or a vehicle employing the onboard-equipment control apparatus 1) is located inside or outside a communication block based on the level of the electric field of an electric wave received by the onboard radio apparatus 3 from a base station of the onboard-equipment control system. The timer unit 5 is a component for measuring the lapse of time.

Based on typically an outside-air temperature signal, an inside-air temperature signal and an inside-air humidity signal, the power-consumption inference unit 6 infers the amount of power, which is consumed by an air conditioner 13 on the assumption that the air conditioner 13 will be activated upon satisfaction of a condition for activation of the air conditioner 13 and the operation of the air conditioner 13 will be terminated upon satisfaction of a condition for termination of the operation of the air conditioner 13 when the air conditioner 13 has not been activated or on the assumption that the operation of the air conditioner 13 will be terminated upon a satisfaction of a condition for termination of the operation of the air conditioner 13 when the air conditioner 13 has been activated. The outside-air temperature signal is generated by an outside air temperature sensor 10 installed outside the vehicle compartment as a signal representing the temperature of air outside the vehicle. The inside-air temperature signal is generated by an inside air temperature sensor 11 installed inside the vehicle compartment as a signal representing the temperature of air inside the vehicle. The inside-air humidity signal is generated by a humidity sensor 12 installed inside the vehicle compartment as a signal representing the humidity of air inside the vehicle. The power-consumption inference unit 6 outputs the inferred power consumption to the control unit 2. The control unit 2 stores the inferred power consumption received from the power-consumption inference unit 6 in the power-consumption storage unit 7.

The air-conditioner ECU 8 activates the air conditioner 13 when an activation signal is received from the control unit 2 but terminates the operation of the air conditioner 13 in operation when a termination signal is received from the control unit 2. Connected between a plus terminal 14a and minus terminal 14b of an onboard battery 14 mounted on the vehicle, the battery residual charge inference unit 9 infers the amount of electric charge left in the onboard battery 14 and outputs the inferred amount of electric charge to the control unit 2. It is to be noted that, in the configuration described above, a portion of the onboard-equipment control apparatus 1 can be included in a navigation apparatus to be described later. In addition, the onboard radio apparatus 3 can be designed separately from the onboard-equipment control apparatus 1.

In the operations described above, as a condition assumed by the control unit 2 to be a condition for activation of the air conditioner 13, the user may set an activation time set in advance as a time to activate the air conditioner 13. As another condition assumed by the control unit 2 to be a condition for activation of the air conditioner 13, the user may operate typically the cellular phone 15 to transmit a command to activate the air conditioner 13 to the onboard radio apparatus 3 by way of the hand-phone network. When a satisfaction of either condition is detected, an activation signal is supplied to the air-conditioner ECU 8, which then activates the air conditioner 13.

As a condition assumed by the control unit 2 to be a condition for termination of the air conditioner 13, on the other hand, the user may set an a termination time set in advance as a time to terminate the operation of the air conditioner 13. As a condition assumed by the control unit 2 to be another condition for termination of the air conditioner 13, the user may operate typically the cellular phone 15 to transmit a command to terminate the operation of the air conditioner 13 to the onboard radio apparatus 3 by way of the hand-phone network. When a satisfaction of either condition is detected, a termination signal is supplied to the air-conditioner ECU 8, which then terminates the operation of the air conditioner 13. It is to be noted that, in this case, the user is capable of setting an activation or termination time by operating typically an operation panel of the navigation apparatus when the user is inside the vehicle compartment or by operating typically a key of the cellular phone 15 when the user is outside the vehicle compartment.

Next, effects of the above configuration are explained by referring to a flowchart shown in FIG. 2. The flowchart shown in FIG. 2 is a flowchart representing processing carried out by the control unit 2. It is to be noted that the user has set an activation time, a termination time and a target temperature in advance. The processing carried out by the control unit 2 is explained below on the assumption that the control unit 2 uses the coincidence of the present time with the activation time as a condition for activation of the air conditioner 13 and the coincidence of the present time with the termination time as a condition for termination of the operation of the air conditioner 13.

As shown in the figure, the flowchart begins with Step S1 at which the control unit 2 determines whether or not the condition for an activation of the air conditioner 13 is satisfied with the onboard-equipment control apparatus 1 put in an activated state. As the control unit 2 detects coincidence of the present time with the activation time set in advance by the user, that is, as the determination result produced at Step S1 is YES, the flow of the processing goes on to Step S2 at which the control unit 2 determines whether or not the onboard radio apparatus 3 employed in the onboard-equipment control apparatus 1 itself is capable of receiving a command to terminate the operation of the air conditioner 13 from the cellular phone 15. In this case, the control unit 2 determines whether or not the onboard radio apparatus 3 is capable of receiving a command to terminate the operation of the air conditioner 13 from the cellular phone 15 by determining whether or not the number of events detected per time unit as events in each of which the level of a reception electrical field at the radio communication apparatus 3 is lower than a predetermined level reaches a predetermined event count. As an alternative, the control unit 2 determines whether or not the onboard radio apparatus 3 is capable of receiving a command to terminate the operation of the air conditioner 13 from the cellular phone 15 by determining whether or not an instance in which the level of a reception electrical field at the radio communication apparatus 3 is lower than a predetermined level has been continuing for a predetermined period of time.

When the control unit 2 determines that the onboard radio apparatus 3 is capable of receiving a command to terminate the operation of the air conditioner 13 from the cellular phone 15, that is, when the determination result produced at Step S2 is YES, the flow of the processing goes on to Step S3 at which the power-consumption inference unit 6 infers a power consumption P1 as the amount of power consumed by the air conditioner 13 on the assumption that the operation of the air conditioner 13 will be terminated upon a satisfaction of a condition for termination of the operation of the air conditioner 13 after the air conditioner 13 has been activated upon a satisfaction of a condition for activation of the air conditioner 13. In this case, the power-consumption inference unit 6 infers the power consumption P1 as the amount of power consumed by the air conditioner 13 based on an activation time, a termination time and a target temperature, which have been set by the user, in addition to the outside-air temperature signal, the inside-air temperature signal and the inside-air humidity signal. As described above, the outside-air temperature signal is generated by the outside air temperature sensor 10, the inside-air temperature signal is generated by the inside air temperature sensor 11 and the inside-air humidity signal is generated by the humidity sensor 12.

Then, at next Step S4, the control unit 2 controls the battery residual charge inference unit 9 to infer a battery residual electric charge P2. Subsequently, the flow of the processing goes on Step S5 to determine whether or not a difference between the inferred battery residual electric charge P2 and the inferred power consumption P1 is at least equal to a predetermined value P0, which has been arbitrarily set by the user or a person in charge of maintenance/application in the car manufacturer. The predetermined value can be any arbitrary value as long as the value at least assures activation desired by the user. For example, the predetermined value corresponds to the amount of battery charge required for starting the engine once or the amount of battery charge required for transmitting a theft notification signal to a central office for handling car thefts.

When the difference between the inferred battery residual electric charge P2 and the inferred power consumption P1 is found at least equal to the predetermined value P0, that is, when the determination result produced at Step S5 is YES, the flow of the processing goes on to Step S6 at which the control unit 2 outputs an activation signal to the air-conditioner ECU 8 as a signal for requesting the air-conditioner ECU 8 to activate the air conditioner 13. When the control unit 2 determines that the onboard radio apparatus 3 is no longer capable of receiving a command to terminate the operation of the air conditioner 13 from the cellular phone 15 after a condition for activation of the air conditioner 13 has been satisfied, that is, when the determination result produced at Step S2 is NO, on the other hand, the execution of the processing is ended without activating the air conditioner 13.

When the difference between the inferred battery residual electric charge P2 and the inferred power consumption P1 is found not greater than the predetermined value P0, that is, when the determination result produced at Step S5 is NO, on the other hand, the flow of the processing goes on to Step S7 at which the control unit 2 executes control to transmit an activation inhibition notification signal from the onboard radio apparatus 3 to the cellular phone 15 as a signal informing the cellular phone 15 that the activation of the air conditioner 13 has been inhibited. Then, the execution of the processing is ended without activating the air conditioner 13.

By carrying out the processing described above, the onboard-equipment control apparatus 1 executes control to activate the air conditioner 13 provided that, after the condition for activation of the air conditioner 13 is satisfied, the onboard radio apparatus 3 is capable of receiving a command to terminate the operation of the air conditioner 13 from the cellular phone 15 and the difference between the inferred battery residual electric charge P2 and the inferred power consumption P1 is found at least equal to the predetermined value P0. When the onboard radio apparatus 3 is not capable of receiving a command to terminate the operation of the air conditioner 13 from the cellular phone 15 and/or the difference between the inferred battery residual electric charge P2 and the inferred power consumption P1 is found not greater than the predetermined value P0, on the other hand, the onboard-equipment control apparatus 1 executes control not to activate the air conditioner 13 even after the condition for activation of the air conditioner 13 is satisfied. In particular, when the onboard radio apparatus 3 is capable of receiving a command to terminate the operation of the air conditioner 13 from the cellular phone 15 but the difference between the inferred battery residual electric charge P2 and the inferred power consumption P1 is found not greater than the predetermined value P0, the activation of the air conditioner 13 is forcibly inhibited.

After the control unit 2 has executed control to activate the air conditioner 13 under the conditions described above, the flow of the processing goes on to Step S8 at which the control unit 2 determines whether or not a condition for termination of the operation of the air conditioner 13 has been satisfied. When the condition for termination of the operation of the air conditioner 13 has not been satisfied, that is, when the determination result of Step S8 is NO, the flow of the processing goes on to Step S9 at which the control unit 2 again determines whether or not the onboard radio apparatus 3 is capable of receiving a command to terminate the operation of the air conditioner 13 from the cellular phone 15. Also in this case, the control unit 2 determines whether or not the onboard radio apparatus 3 is capable of receiving a command to terminate the operation of the air conditioner 13 from the cellular phone 15 by determining whether or not the number of events detected per time unit as events in each of which the level of a reception electrical field at the radio communication apparatus 3 is lower than a predetermined level reaches a predetermined event count. As an alternative, the control unit 2 determines whether or not the onboard radio apparatus 3 is capable of receiving a command to terminate the operation of the air conditioner 13 from the cellular phone 15 by determining whether or not an instance in which the level of a reception electrical field at the radio communication apparatus 3 is lower than a predetermined level has been continuing for a predetermined period of time.

When the control unit 2 determines that the onboard radio apparatus 3 is capable of receiving a command to terminate the operation of the air conditioner 13 from the cellular phone 15, that is, when the determination result produced at Step S9 is YES, the flow of the processing goes on to Step S10 at which the power-consumption inference unit 6 infers a power consumption P1 as the amount of power consumed by the air conditioner 13 on the assumption that the operation of the air conditioner 13 will be terminated upon a satisfaction of a condition for termination of the operation of the air conditioner 13 after the air conditioner 13 has been activated upon a satisfaction of a condition for activation of the air conditioner 13. Also in this case, the power-consumption inference unit 6 infers the power consumption P1 as the amount of power consumed by the air conditioner 13 based on an activation time, a termination time and a target temperature, which have been set by the user, in addition to the outside-air temperature signal, the inside-air temperature signal and the inside-air humidity signal. As described above, the outside-air temperature signal is generated by the outside air temperature sensor 10, the inside-air temperature signal is generated by the inside air temperature sensor 11 and the inside-air humidity signal is generated by the humidity sensor 12.

Then, at next Step S11, the control unit 2 controls the battery residual charge inference unit 9 to infer a battery residual electric charge P2. Subsequently, the flow of the processing goes on Step S12 to determine whether or not a difference between the inferred battery residual electric charge P2 and the inferred power consumption P1 is at least equal to the predetermined value P0. It is to be noted that the power consumption P1 inferred at Step S3 prior to the activation of the air conditioner 13 in accordance with control executed by the control unit 2 and the battery residual electrical charge P2 inferred at Step S4 prior to the activation of the air conditioner 13 are fixed because the air conditioner 13 has not been activated. However, the power consumption P1 inferred at Step S10 prior to the activation of the air conditioner 13 in accordance with control executed by the control unit 2 and the battery residual electrical charge P2 inferred at Step S11 prior to the activation of the air conditioner 13 change from time to time because the air conditioner 13 has been activated.

When the difference between the inferred battery residual electric charge P2 and the inferred power consumption P1 is found at least equal to the predetermined value P0, that is, when the determination result produced at Step S12 is YES, the flow of the processing goes back to Step S8. When the condition for termination of the operation of the air conditioner 13 has been satisfied, that is, when the determination result of Step S8 is YES, on the other hand, the flow of the processing goes on to Step S13 at which the control unit 2 outputs a termination signal to the air-conditioner ECU 8 as a signal requesting the air-conditioner ECU 8 to terminate the operation of the activated air conditioner 13. Then, the execution of the processing is ended.

When the control unit 2 determines that the onboard radio apparatus 3 is not capable of receiving a command to terminate the operation of the air conditioner 13 from the cellular phone 15 even before the condition for termination of the operation of the air conditioner 13 is satisfied, that is, when the determination result produced at Step S9 is NO, on the other hand, the flow of the processing also goes on to Step S13 at which the control unit 2 outputs a termination signal to the air-conditioner ECU 8 as a signal requesting the air-conditioner ECU 8 to terminate the operation of the activated air conditioner 13. Then, the execution of the processing is ended. When the difference between the inferred battery residual electric charge P2 and the inferred power consumption P1 is found not greater than the predetermined value P0, that is, when the determination result produced at Step S12 is NO, on the other hand, the flow of the processing goes on to Step S14 at which the control unit 2 outputs a termination signal to the air-conditioner ECU 8 as a signal requesting the air-conditioner ECU 8 to terminate the operation of the activated air conditioner 13. Then, at next Step S15, the control unit 2 executes control to transmit a termination notification signal from the onboard radio apparatus 3 to the cellular phone 15 as a signal informing the cellular phone 15 that the operation of the air conditioner 13 has been terminated. Finally, the execution of the processing is ended.

By carrying out the processing described above, the onboard-equipment control apparatus 1 executes control to forcibly terminate the operation of the activated air conditioner 13 even before the condition for termination of the operation of the air conditioner 13 is satisfied provided that the onboard radio apparatus 3 is found no longer capable of receiving a command to terminate the operation of the air conditioner 13 from the cellular phone 15 and/or the difference between the inferred battery residual electric charge P2 and the inferred power consumption P1 is found not greater than the predetermined value P0 after the activation of the air conditioner 13.

Although activation of the air conditioner 13 and termination of the operation of the air conditioner 13 serving as an onboard apparatus controlled by the onboard-equipment control apparatus 1 have been explained, activation of another onboard apparatus and termination of its operation can be controlled by the onboard-equipment control apparatus 1 in the same way. In addition, as described above, the control unit 2 determines whether or not the onboard radio apparatus 3 is capable of receiving a command to terminate the operation of the air conditioner 13 from the cellular phone 15 by determining whether or not the number of events detected per time unit as events in each of which the level of a reception electrical field at the radio communication apparatus 3 is lower than a predetermined level reaches a predetermined event count or, as an alternative, the control unit 2 determines whether or not the onboard radio apparatus 3 is capable of receiving a command to terminate the operation of the air conditioner 13 from the cellular phone 15 by determining whether or not an instance in which the level of a reception electrical field at the radio communication apparatus 3 is lower than a predetermined level has been continuing for a predetermined period of time. However, the control unit 2 may also determine whether or not the onboard radio apparatus 3 is capable of receiving a command to terminate the operation of the air conditioner 13 from the cellular phone 15 by determining whether or not the onboard radio apparatus 3 is out of order due to some causes.

As described above, in accordance with the first embodiment, the onboard-equipment control apparatus 1 is implemented as a configuration in which the onboard-equipment control apparatus 1 executes control to forcibly terminate the operation of the activated air conditioner 13 even before the condition for termination of the operation of the air conditioner 13 is satisfied provided that the onboard radio apparatus 3 is found no longer capable of receiving a command to terminate the operation of the air conditioner 13 from the cellular phone 15 while the air conditioner 13 is operating. Thus, the onboard battery 14 can be prevented in advance from running out of accumulated electric charge required for continuing the operation of the air conditioner 13 thereafter. As a result, the user can be prevented in advance from being put in a difficult situation.

In addition, in the configuration described above, the onboard-equipment control apparatus 1 also executes control to forcibly terminate the operation of the activated air conditioner 13 while the air conditioner 13 is operating even before the condition for termination of the operation of the air conditioner 13 is satisfied provided that the difference between the inferred battery residual electric charge P2 and the power consumption P1 inferred as the amount of power consumed by the air conditioner 13 on the assumption that the operation of the air conditioner 13 will be terminated upon a satisfaction of a condition for termination of the operation of the air conditioner 13 after the air conditioner 13 has been activated upon a satisfaction of a condition for activation of the air conditioner 13 is found not greater than the predetermined value P0 after the activation of the air conditioner 13. Thus, the onboard battery 14 can be prevented in advance from running out of accumulated electric charge required for continuing the operation of the air conditioner 13 thereafter. As a result, the user can be prevented in advance from being put in a difficult situation. On the top of that, in this case, the control unit 2 executes control to transmit a termination notification signal from the onboard radio apparatus 3 to the cellular phone 15 as a signal informing the cellular phone 15 that the operation of the air conditioner 13 has been terminated. Thus, the user can be informed of the fact that the operation of the air conditioner 13 has been terminated forcibly because the difference between the inferred battery residual electric charge P2 left in the onboard battery 14 and the inferred power consumption P1 is found not greater than the predetermined value P0.

In addition, in the configuration described above, when the onboard radio apparatus 3 is not capable of receiving a command to terminate the operation of the air conditioner 13 from the cellular phone 15, the onboard-equipment control apparatus 1 executes control to forcibly inhibit activation of the air conditioner 13 even after the condition for activation of the air conditioner 13 is satisfied. Thus, the onboard battery 14 can be prevented in advance from running out of accumulated electric charge required for operating the activated air conditioner 13 thereafter. As a result, the user can be prevented in advance from being put in a difficult situation.

In addition, in the configuration described above, when the difference between the inferred battery residual electric charge P2 and the power consumption P1 inferred as the amount of power consumed by the air conditioner 13 on the assumption that the operation of the air conditioner 13 will be terminated upon a satisfaction of a condition for termination of the operation of the air conditioner 13 after the air conditioner 13 has been activated upon a satisfaction of a condition for activation of the air conditioner 13 is found not greater than the predetermined value P0, the onboard-equipment control apparatus 1 executes control to forcibly inhibit activation of the air conditioner 13 even after the condition for activation of the air conditioner 13 is satisfied. Thus, the onboard battery 14 can be prevented in advance from running out of accumulated electric charge required for operating the activated air conditioner 13 thereafter. As a result, the user can be prevented in advance from being put in a difficult situation. On the top of that, in this case, the control unit 2 executes control to transmit an activation inhibition notification signal from the onboard radio apparatus 3 to the cellular phone 15 as a signal informing the cellular phone 15 that the activation of the air conditioner 13 has been forcibly inhibited. Thus, the user can be informed of the fact that the activation of the air conditioner 13 has been forcibly inhibited because the difference between the inferred battery residual electric charge P2 left in the onboard battery 14 and the inferred power consumption P1 is found not greater than the predetermined value P0.

Second Embodiment

Figure 3:
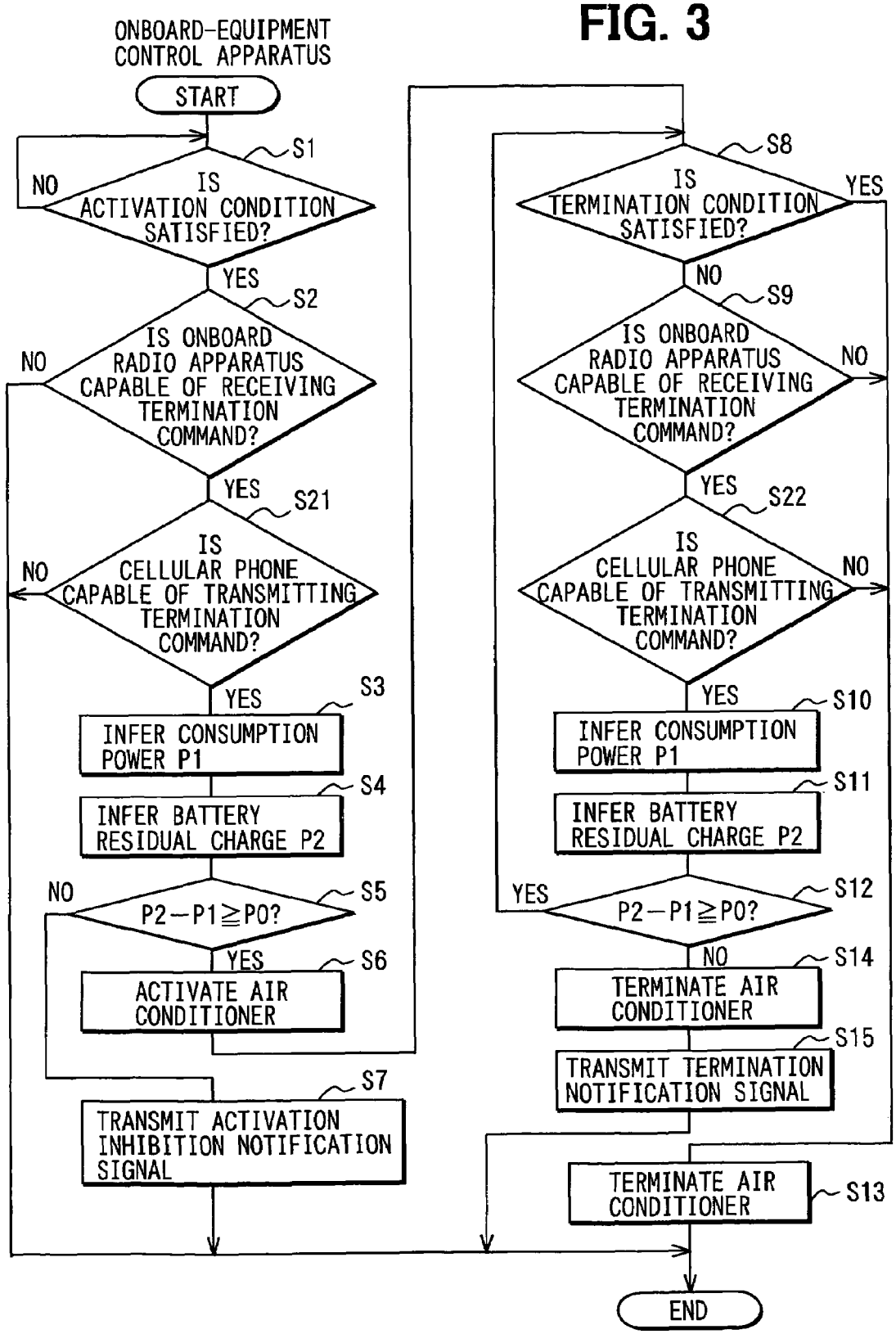
FIG. 3 shows a flowchart representing processing carried out by an onboard-equipment control apparatus employed in an onboard-equipment control system according to a second embodiment of the present invention as a counterpart of the flowchart shown in FIG. 2.

Next, a second embodiment of the present invention is explained by referring to a flowchart shown in FIG. 3. It is to be noted that components identical with their respective counterparts employed in the first embodiment are not explained again. That is, only differences between the first and second embodiments are described.

In the case of the second embodiment, as the control unit 2 detects satisfaction of the condition for activation of the air conditioner 13, that is, as the determination result produced at Step S1 is YES, the flow of the processing goes on to Step S2 at which the control unit 2 determines whether or not the onboard radio apparatus 3 is capable of receiving a command to terminate the operation of the air conditioner 13 from the cellular phone 15. When the control unit 2 determines that the onboard radio apparatus 3 is capable of receiving a command to terminate the operation of the air conditioner 13 from the cellular phone 15, that is, when the determination result produced at Step S2 is YES, the flow of the processing goes on to Step S21 at which the control unit 2 determines whether or not the cellular phone 15 is capable of transmitting a command to terminate the operation of the air conditioner 13 to the onboard radio apparatus 3. In this case, the control unit 2 determines whether or not the cellular phone 15 is capable of transmitting a command to terminate the operation of the air conditioner 13 to the onboard radio apparatus 3 by determining whether or not the number of events detected per time unit as events in each of which the level of a reception electrical field at the cellular phone 15 is lower than a predetermined level reaches a predetermined event count. As an alternative, the control unit 2 determines whether or not the cellular phone 15 is capable of transmitting a command to terminate the operation of the air conditioner 13 to the onboard radio apparatus 3 by determining whether or not an instance in which the level of a reception electrical field at the cellular phone 15 is lower than a predetermined level has been continuing for a predetermined period of time. The control unit 2 determines whether or not the level of a reception electrical field at the cellular phone 15 is lower than a predetermined level by execution of control to drive the onboard radio apparatus 3 to receive an electrical field from the cellular phone 15 periodically or by periodically transmitting an inquiry about the level of a reception electrical field at the cellular phone 15.

When the control unit 2 determines that the cellular phone 15 is capable of transmitting a command to terminate the operation of the air conditioner 13 to the onboard radio apparatus 3, that is, when the determination result produced at Step S21 is YES, the processes of Step S3 and the subsequent steps are carried out in the same way as the first embodiment.

When the control unit 2 determines that the cellular phone 15 is not capable of transmitting a command to terminate the operation of the air conditioner 13 to the onboard radio apparatus 3, that is, when the determination result produced at Step S21 is NO, on the other hand, the execution of the processing is ended without activating the air conditioner 13 in the same way as the case in which the onboard radio apparatus 3 is not capable of receiving a command to terminate the operation of the air conditioner 13 from the cellular phone 15.

In addition, at Step S8, the control unit 2 determines whether or not a condition for termination of the operation of the air conditioner 13 has been satisfied. When the condition for termination of the operation of the air conditioner 13 has not been satisfied, that is, when the determination result of Step S8 is NO, the flow of the processing goes on to Step S9 at which the control unit 2 again determines whether or not the onboard radio apparatus 3 is capable of receiving a command to terminate the operation of the air conditioner 13 from the cellular phone 15. When the control unit 2 determines that the onboard radio apparatus 3 is capable of receiving a command to terminate the operation of the air conditioner 13 from the cellular phone 15, that is, when the determination result produced at Step S9 is YES, the flow of the processing goes on to Step S22 at which the control unit 2 again determines whether or not the cellular phone 15 is capable of transmitting a command to terminate the operation of the air conditioner 13 to the onboard radio apparatus 3.

When the control unit 2 determines that the cellular phone 15 is capable of transmitting a command to terminate the operation of the air conditioner 13 to the onboard radio apparatus 3, that is, when the determination result produced at Step S22 is YES, the processes of Step S10 and the subsequent steps are carried out in the same way as the first embodiment.

When the control unit 2 determines that the cellular phone 15 is not capable of transmitting a command to terminate the operation of the air conditioner 13 to the onboard radio apparatus 3, that is, when the determination result produced at Step S22 is NO, on the other hand, the execution of the processing is ended after the control unit 2 outputs a termination signal to the air-conditioner ECU 8 as a signal requesting the air-conditioner ECU 8 to terminate the operation of the activated air conditioner 13 in the same say as the case in which the onboard radio apparatus 3 is not capable of receiving a command to terminate the operation of the air conditioner 13 from the cellular phone 15.

As described above, in accordance with the second embodiment, the onboard-equipment control apparatus 1 is implemented as a configuration in which the onboard-equipment control apparatus 1 executes control to forcibly terminate the operation of the activated air conditioner 13 even before the condition for termination of the operation of the air conditioner 13 is satisfied provided that the onboard radio apparatus 3 is found no longer capable of receiving a command to terminate the operation of the air conditioner 13 from the cellular phone 15 or the cellular phone 15 is found no longer capable of transmitting a command to terminate the operation of the air conditioner 13 to the onboard radio apparatus 3 while the air conditioner 13 is operating. Thus, much like the first embodiment described earlier, the onboard battery 14 can be prevented in advance from running out of accumulated electric charge required for continuing the operation of the air conditioner 13 thereafter. As a result, the user can be prevented in advance from being put in a difficult situation.

In addition, in the configuration described above, when the onboard radio apparatus 3 is not capable of receiving a command to terminate the operation of the air conditioner 13 from the cellular phone 15 or when the cellular phone 15 is not capable of transmitting a command to terminate the operation of the air conditioner 13 to the onboard radio apparatus 3, the onboard-equipment control apparatus 1 executes control to forcibly inhibit activation of the air conditioner 13 even after the condition for activation of the air conditioner 13 is satisfied. Thus, much like the first embodiment described earlier, the onboard battery 14 can be prevented in advance from running out of accumulated electric charge required for operating the activated air conditioner 13 thereafter. As a result, the user can be prevented in advance from being put in a difficult situation.

Third Embodiment

Figure 4:
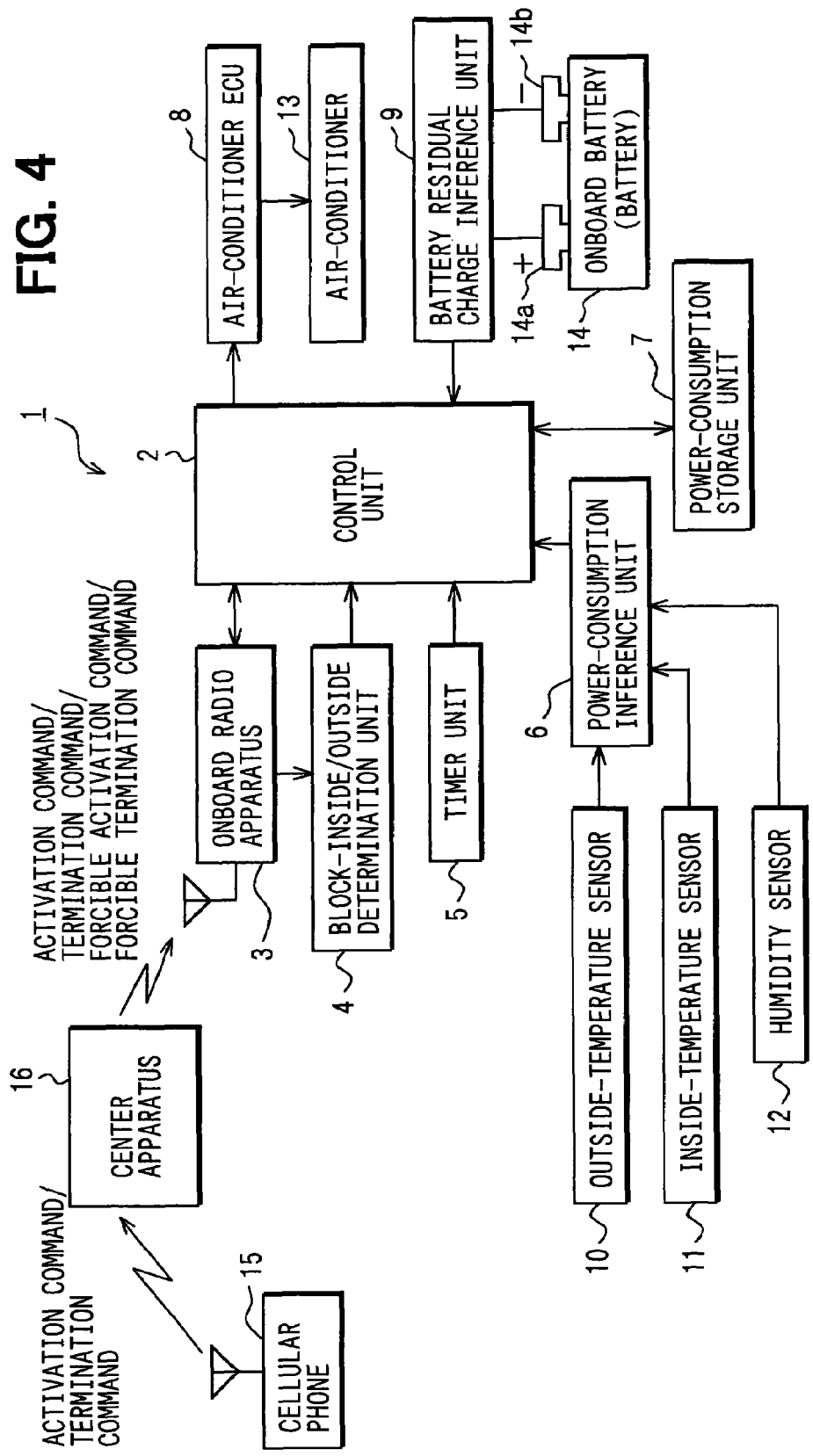
FIG. 4 is a functional block diagram showing the configuration of an onboard-equipment control system according to a third embodiment of the present invention.
Figure 5:
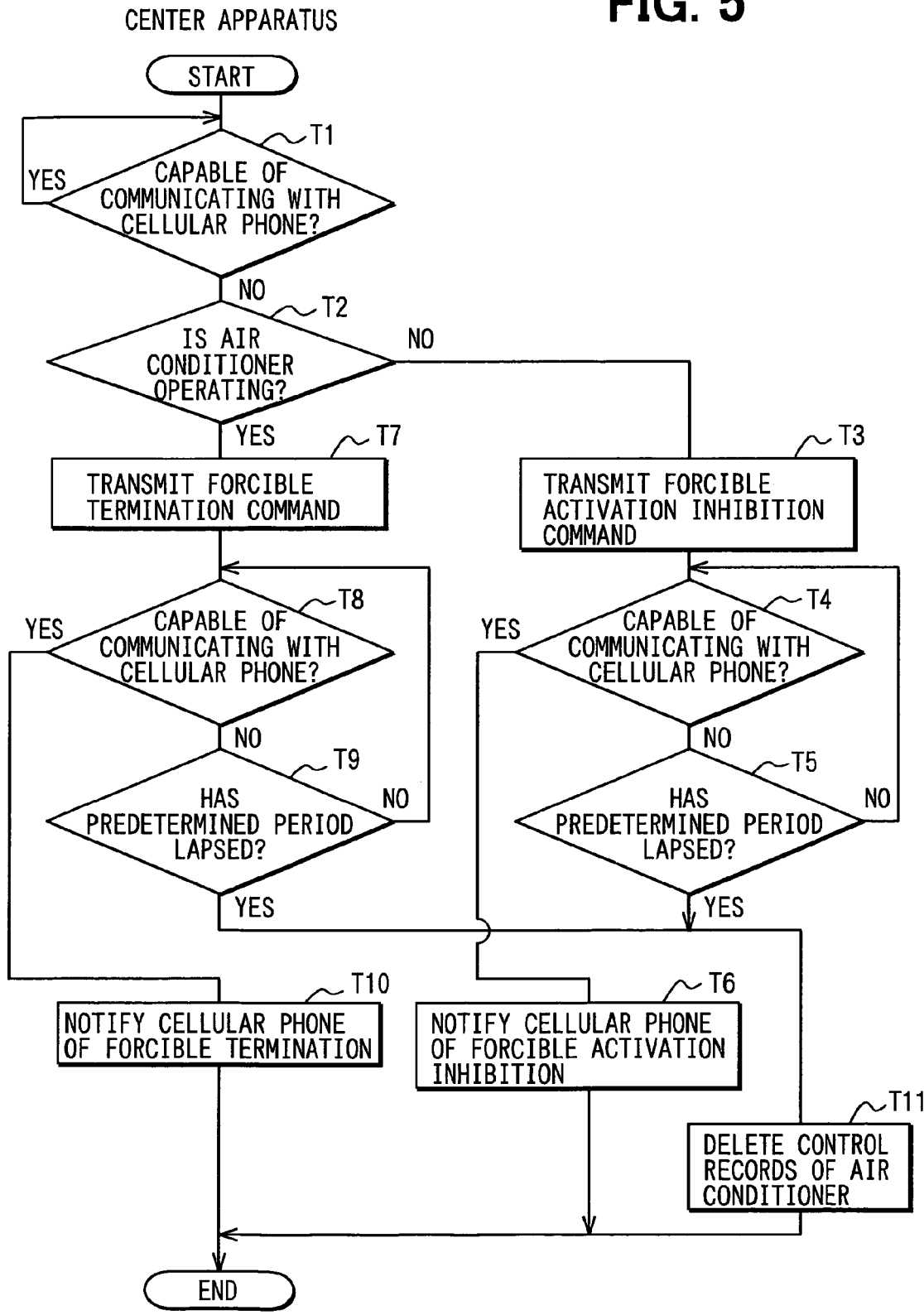
FIG. 5 shows a flowchart representing processing carried out by a center apparatus employed in the onboard-equipment control system according to the third embodiment of the present invention.
Figure 6:
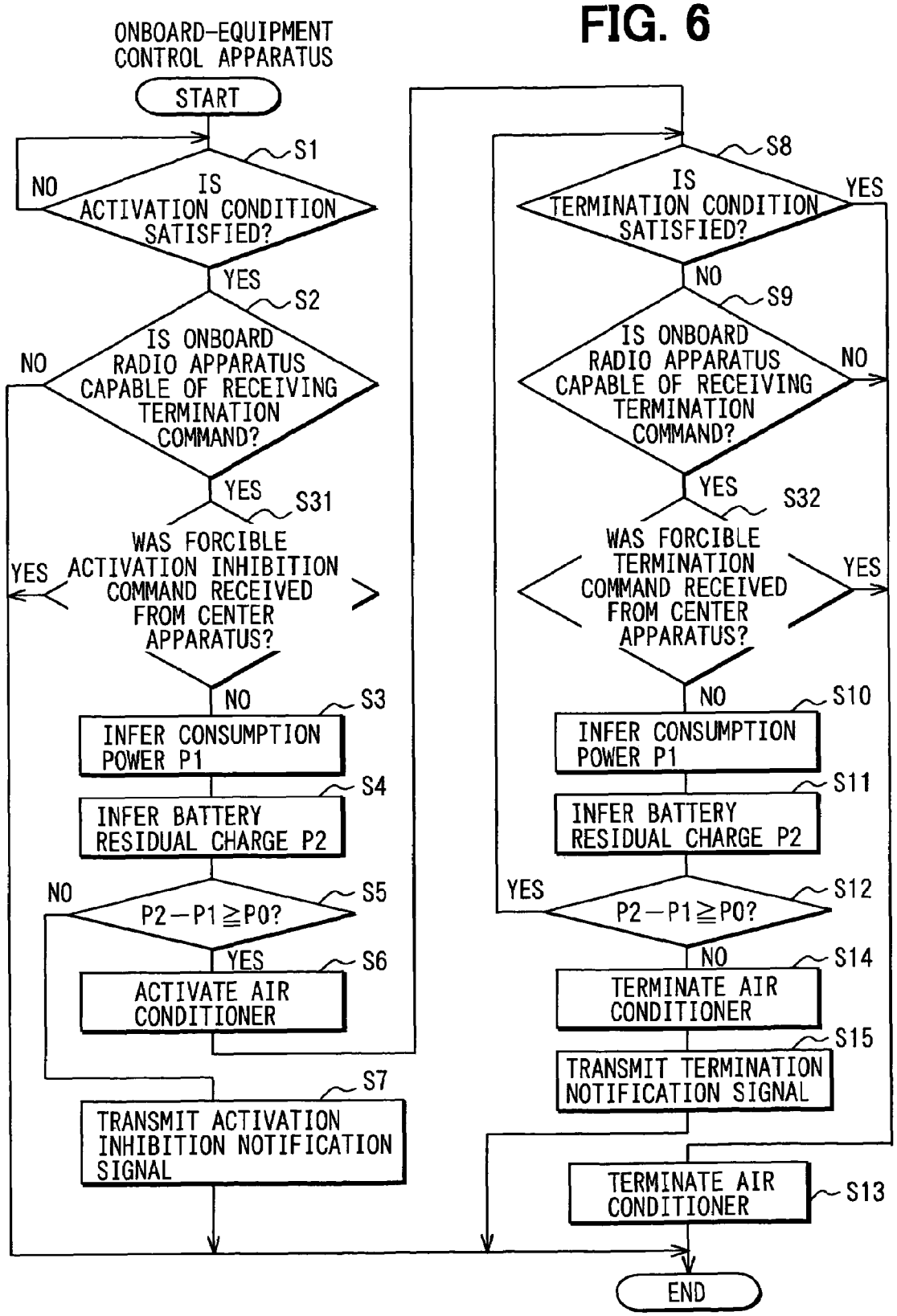
FIG. 6 shows a flowchart representing processing carried out by an onboard-equipment control apparatus employed in the onboard-equipment control system according to the third embodiment of the present invention as a counterpart of the flowchart shown in FIG. 2.

Next, a third embodiment of the present invention is explained by referring to FIGS. 4 to 6. FIG. 4 is a functional block diagram showing the configuration of an onboard-equipment control system provided by the third embodiment. FIG. 5 shows a flowchart representing processing carried out by a center apparatus 16 employed in the onboard-equipment control system shown in FIG. 4. FIG. 6 shows a flowchart representing processing carried out by the onboard-equipment control apparatus 1 employed in the onboard-equipment control system shown in FIG. 4. It is to be noted that components identical with their respective counterparts employed in the first embodiment are not explained again. That is, only differences between the first and third embodiments are described.

As shown in FIG. 5, the flowchart begins with Step T1 at which the center apparatus 16 determines whether or not communications with the cellular phone 15 can be carried out, that is, whether or not a communication link to the cellular phone 15 can be established. When communications with the cellular phone 15 cannot be carried out, that is, when the determination result produced at Step T1 is NO, the flow of the processing goes on to Step T2 at which the center apparatus 16 determines whether or not the air conditioner 13 is operating. When the air conditioner 13 is not operating, that is, when the determination result produced at Step T2 is NO, the flow of the processing goes on to Step T3 at which the center apparatus 16 transmits a forcible activation inhibition command to the onboard-equipment control apparatus 1.

At Step S31 of a flowchart shown in FIG. 6, the control unit 2 employed in the onboard-equipment control apparatus 1 determines whether or not the onboard radio apparatus 3 has received the forcible activation inhibition command from the center apparatus 16 after the condition for activation of the air conditioner 13 is satisfied. When the onboard radio apparatus 3 has not received the forcible activation inhibition command from the center apparatus 16, that is, when the determination result produced at Step S31 is NO, processes of Step S3 and the subsequent steps are carried out in the same way as the first embodiment.

When the control unit 2 determines that the onboard radio apparatus 3 has received the forcible activation inhibition command from the center apparatus 16, that is, when the determination result produced at Step S31 is YES, on the other hand, the execution of the processing is ended without activating the air conditioner 13 in the same way as the case in which the onboard radio apparatus 3 is not capable of receiving a command to terminate the operation of the air conditioner 13 from the cellular phone 15.

It is to be noted that, after the center apparatus 16 transmits a forcible activation inhibition command to the onboard-equipment control apparatus 1, at Steps T4 and T5, the center apparatus 16 determines whether or not the state of being incapable of communicating with the cellular phone 15 has been returned to the state of being capable of communicating with the cellular phone 15 within a predetermined period of time. When the state of being incapable of communicating with the cellular phone 15 has been returned to the state of being capable of communicating with the cellular phone 15 within the predetermined period of time, that is, when the determination result produced at Step T4 is YES, the flow of the processing goes on to Step T6 at which the center apparatus 16 informs the cellular phone 15 that the activation the air conditioner 13 has been inhibited forcibly. When the state of being incapable of communicating with the cellular phone 15 has not been returned to the state of being capable of communicating with the cellular phone 15 even after the predetermined period of time has lapsed, that is, when the determination result produced at Step T5 is YES, on the other hand, the flow of the processing goes on to Step T11 at which a control record stored in the center apparatus 16 as a control record of the air conditioner 13 is deleted before the execution of the processing is ended.

When the air conditioner 13 is found operating after the center apparatus 16 determines that communications with the cellular phone 15 cannot be carried out, that is, when the determination result produced at Step T2 is YES, on the other hand, the flow of the processing goes on to Step T7 at which the center apparatus 16 transmits a command to forcibly terminate the operation of the air conditioner 13 to the onboard-equipment control apparatus 1.

At Step S31 of a flowchart shown in FIG. 6, the control unit 2 employed in the onboard-equipment control apparatus 1 determines whether or not the onboard radio apparatus 3 has received the command to forcibly terminate the operation of the air conditioner 13 from the center apparatus 16 after the air conditioner 13 has been activated. When the onboard radio apparatus 3 has not received the command to forcibly terminate the operation of the air conditioner 13 from the center apparatus 16, that is, when the determination result produced at Step S32 is NO, processes of Step S10 and the subsequent steps are carried out in the same way as the first embodiment.

When the control unit 2 determines that the onboard radio apparatus 3 has received the command to forcibly terminate the operation of the air conditioner 13 from the center apparatus 16, that is, when the determination result produced at Step S32 is YES, on the other hand, the flow of the processing goes on to Step S13 at which the control unit 2 outputs a termination signal to the air-conditioner ECU 8 as a signal requesting the air-conditioner ECU 8 to terminate the operation of the activated air conditioner 13 before the execution of the processing is ended in the same way as the case in which the onboard radio apparatus 3 is not capable of receiving a command to terminate the operation of the air conditioner 13 from the cellular phone 15.

It is to be noted that, also in this case, after the center apparatus 16 transmits a command to forcibly terminate the operation of the air conditioner 13 to the onboard-equipment control apparatus 1, at Steps T8 and T9, the center apparatus 16 determines whether or not the state of being incapable of communicating with the cellular phone 15 has been returned to the state of being capable of communicating with the cellular phone 15 within a predetermined period of time. When the state of being incapable of communicating with the cellular phone 15 has been returned to the state of being capable of communicating with the cellular phone 15 within the predetermined period of time, that is, when the determination result produced at Step T8 is YES, the flow of the processing goes on to Step T10 at which the center apparatus 16 informs the cellular phone 15 that the operation of the air conditioner 13 has been terminated forcibly. When the state of being incapable of communicating with the cellular phone 15 has not been returned to the state of being capable of communicating with the cellular phone 15 even though the predetermined period of time has lapsed, that is, when the determination result produced at Step T9 is YES, on the other hand, the flow of the processing goes on to Step T11 at which a control record stored in the center apparatus 16 as a control record of the air conditioner 13 is deleted and the execution of the processing is ended.

As described above, in accordance with the third embodiment, the onboard-equipment control apparatus 1 is implemented as a configuration in which the onboard-equipment control apparatus 1 executes control to forcibly terminate the operation of the activated air conditioner 13 even before the condition for termination of the operation of the air conditioner 13 is satisfied provided that, while the air conditioner 13 is operating, the onboard radio apparatus 3 is found incapable of receiving a command to terminate the operation of the air conditioner 13 from the cellular phone 15 or the onboard radio apparatus 3 receives a command to forcibly terminate the operation of the air conditioner 13 from the center apparatus 16. Thus, much like the first embodiment described earlier, the onboard battery 14 can be prevented in advance from running out of accumulated electric charge required for operating the activated air conditioner 13 thereafter. As a result, the user can be prevented in advance from being put in a difficult situation.

In addition, in the configuration described above, the onboard-equipment control apparatus 1 executes control to forcibly inhibit activation of the air conditioner 13 even after the condition for activation of the air conditioner 13 is satisfied provided that the onboard radio apparatus 3 is found incapable of receiving a command to terminate the operation of the air conditioner 13 from the cellular phone 15 or the onboard radio apparatus 3 receives a forcible activation inhibition command from the center apparatus 16. Thus, much like the first embodiment described earlier, the onboard battery 14 can be prevented in advance from running out of accumulated electric charge required for operating the activated air conditioner 13 thereafter. As a result, the user can be prevented in advance from being put in a difficult situation.

Fourth Embodiment

Figure 7:
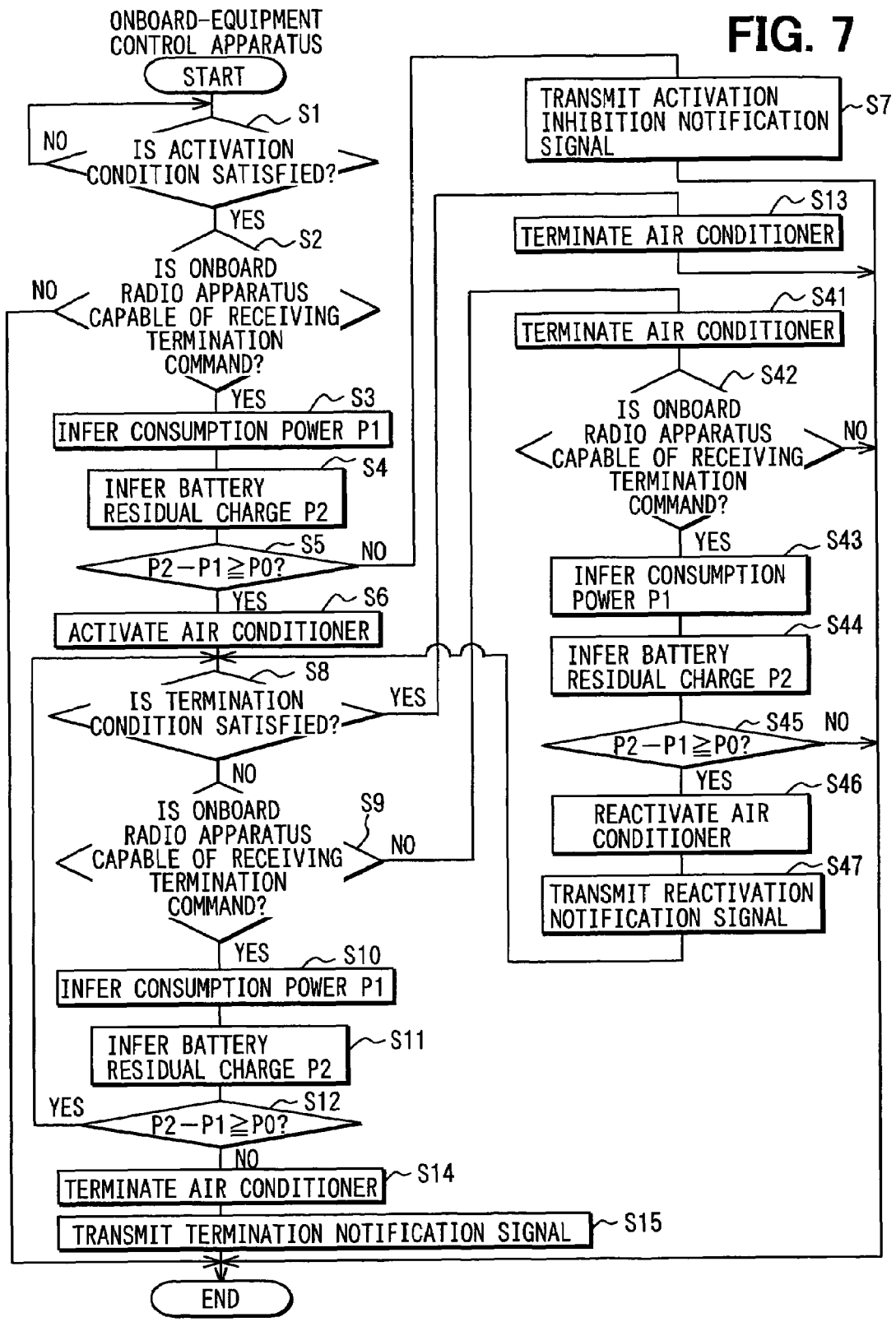
FIG. 7 shows a flowchart representing processing carried out by an onboard-equipment control apparatus employed in an onboard-equipment control system according to a fourth embodiment of the present invention as a counterpart of the flowchart shown in FIG. 2.

Next, a fourth embodiment of the present invention is explained by referring to a flowchart shown in FIG. 7. It is to be noted that components identical with their respective counterparts employed in the first embodiment are not explained again. That is, only differences between the first and fourth embodiments are described.

FIG. 7 shows a flowchart representing processing carried out by the onboard-equipment control apparatus 1 provided by the fourth embodiment. At Step S41 of the flowchart, the control unit 2 employed in the onboard-equipment control apparatus 1 executes control to terminate the operation of the air conditioner 13. Then, at next Step S42, the control unit 2 again determines whether or not the onboard radio apparatus 3 is capable of receiving a command to terminate the operation of the air conditioner 13 from the cellular phone 15. When the control unit 2 determines that the onboard radio apparatus 3 is capable of receiving a command to terminate the operation of the air conditioner 13 from the cellular phone 15, that is, when the control unit 2 determines that the state in which the onboard radio apparatus 3 is not capable of receiving a command to terminate the operation of the air conditioner 13 from the cellular phone 15 has been returned to the state in which the onboard radio apparatus 3 is capable of receiving a command to terminate the operation of the air conditioner 13 from the cellular phone 15 or the determination result of Step S42 is YES, the flow of the processing goes on to Step S43 at which the power-consumption inference unit 6 infers a power consumption P1 as the amount of power consumed by the air conditioner 13 on the assumption that the operation of the air conditioner 13 will be terminated upon a satisfaction of a condition for termination of the operation of the air conditioner 13 after the air conditioner 13 has been reactivated upon a satisfaction of a recondition for activation of the air conditioner 13. Then, at next Step S44, the control unit 2 controls the battery residual charge inference unit 9 to infer a battery residual electric charge P2. Subsequently, the flow of the processing goes on Step S45 to determine whether or not a difference between the inferred battery residual electric charge P2 and the inferred power consumption P1 is at least equal to a predetermined value P0.

When the difference between the inferred battery residual electric charge P2 and the inferred power consumption P1 is found at least equal to the predetermined value P0, that is, when the determination result produced at Step S45 is YES, the flow of the processing goes on to Step S46 at which the control unit 2 executes control to output a reactivation signal to the air-conditioner ECU 8 as a signal requesting the air-conditioner ECU 8 to reactivate the air conditioner 13. Then, at next Step S47, the control unit 2 executes control to transmit a reactivation notification signal from the onboard radio apparatus 3 to the cellular phone 15 as a signal informing the cellular phone 15 that the air conditioner 13 has been reactivated. Subsequently, the processes of Step S8 and the subsequent steps of the first embodiment described earlier are carried out.

When the control unit 2 determines that the onboard radio apparatus 3 is not capable of receiving a command to terminate the operation of the air conditioner 13 from the cellular phone 15, that is, when the control unit 2 determines that the state in which the onboard radio apparatus 3 is not capable of receiving a command to terminate the operation of the air conditioner 13 from the cellular phone 15 has not been returned to the state in which the onboard radio apparatus 3 is capable of receiving a command to terminate the operation of the air conditioner 13 from the cellular phone 15 or the determination result of Step S42 is NO, on the other hand the execution of the processing is ended without reactivating the air conditioner 13. The execution of the processing is also ended without reactivating the air conditioner 13 when the difference between the inferred battery residual electric charge P2 and the inferred power consumption P1 is found not greater than the predetermined value P0, that is, when the determination result produced at Step S45 is NO.

As described above, the state in which the onboard radio apparatus 3 is not capable of receiving a command to terminate the operation of the air conditioner 13 from the cellular phone 15 is taken as a condition for termination of the operation of the air conditioner 13. On the other hand, a recovery from the state in which the onboard radio apparatus 3 is not capable of receiving a command to terminate the operation of the air conditioner 13 from the cellular phone 15 to the state in which the onboard radio apparatus 3 is capable of receiving a command to terminate the operation of the air conditioner 13 from the cellular phone 15 is taken as a condition for reactivating the air conditioner 13. When the state of the cellular phone 15 being incapable of transmitting a command to terminate the operation of the air conditioner 13 to the onboard radio apparatus 3 is taken as a condition for termination of the operation of the air conditioner 13 as is the case of the second embodiment explained earlier, however, a recovery from the state of the cellular phone 15 being incapable of transmitting a command to terminate the operation of the air conditioner 13 to the onboard radio apparatus 3 to the state of the cellular phone 15 being capable of transmitting a command to terminate the operation of the air conditioner 13 to the onboard radio apparatus 3 can also be taken as a condition for reactivating the air conditioner 13.

As described above, in accordance with the fourth embodiment, the onboard-equipment control apparatus 1 is implemented as a configuration in which, after the onboard-equipment control apparatus 1 executes control to terminate the operation of the air conditioner 13 upon detection of the fact that the onboard radio apparatus 3 is no longer capable of receiving a command to terminate the operation of the air conditioner 13 from the cellular phone 15, the onboard-equipment control apparatus 1 executes control to reactivate the air conditioner 13 when the state in which the onboard radio apparatus 3 is not capable of receiving a command to terminate the operation of the air conditioner 13 from the cellular phone 15 is returned to the state in which the onboard radio apparatus 3 is capable of receiving a command to terminate the operation of the air conditioner 13 from the cellular phone 15. Thus, the stopped air conditioner 13 can be restored to a state prior to the termination when the state in which the onboard radio apparatus 3 is not capable of receiving a command to terminate the operation of the air conditioner 13 from the cellular phone 15 is returned to the state in which the onboard radio apparatus 3 is capable of receiving a command to terminate the operation of the air conditioner 13 from the cellular phone 15.

In addition, in the configuration described above, after the onboard-equipment control apparatus 1 executes control to terminate the operation of the air conditioner 13 upon detection of the fact that the cellular phone 15 is no longer capable of transmitting a command to terminate the operation of the air conditioner 13 to the onboard radio apparatus 3, the onboard-equipment control apparatus 1 also executes control to reactivate the air conditioner 13 when the state in which the cellular phone 15 is not capable of transmitting a command to terminate the operation of the air conditioner 13 to the onboard radio apparatus 3 is returned to the state in which the cellular phone 15 is capable of transmitting a command to terminate the operation of the air conditioner 13 to the onboard radio apparatus 3. Thus, the stopped air conditioner 13 can be restored to a state prior to the termination when the state in which the cellular phone 15 is not capable of transmitting a command to terminate the operation of the air conditioner 13 to the onboard radio apparatus 3 is returned to the state in which the cellular phone 15 is capable of transmitting a command to terminate the operation of the air conditioner 13 to the onboard radio apparatus 3.

Fifth Embodiment

Figure 8:
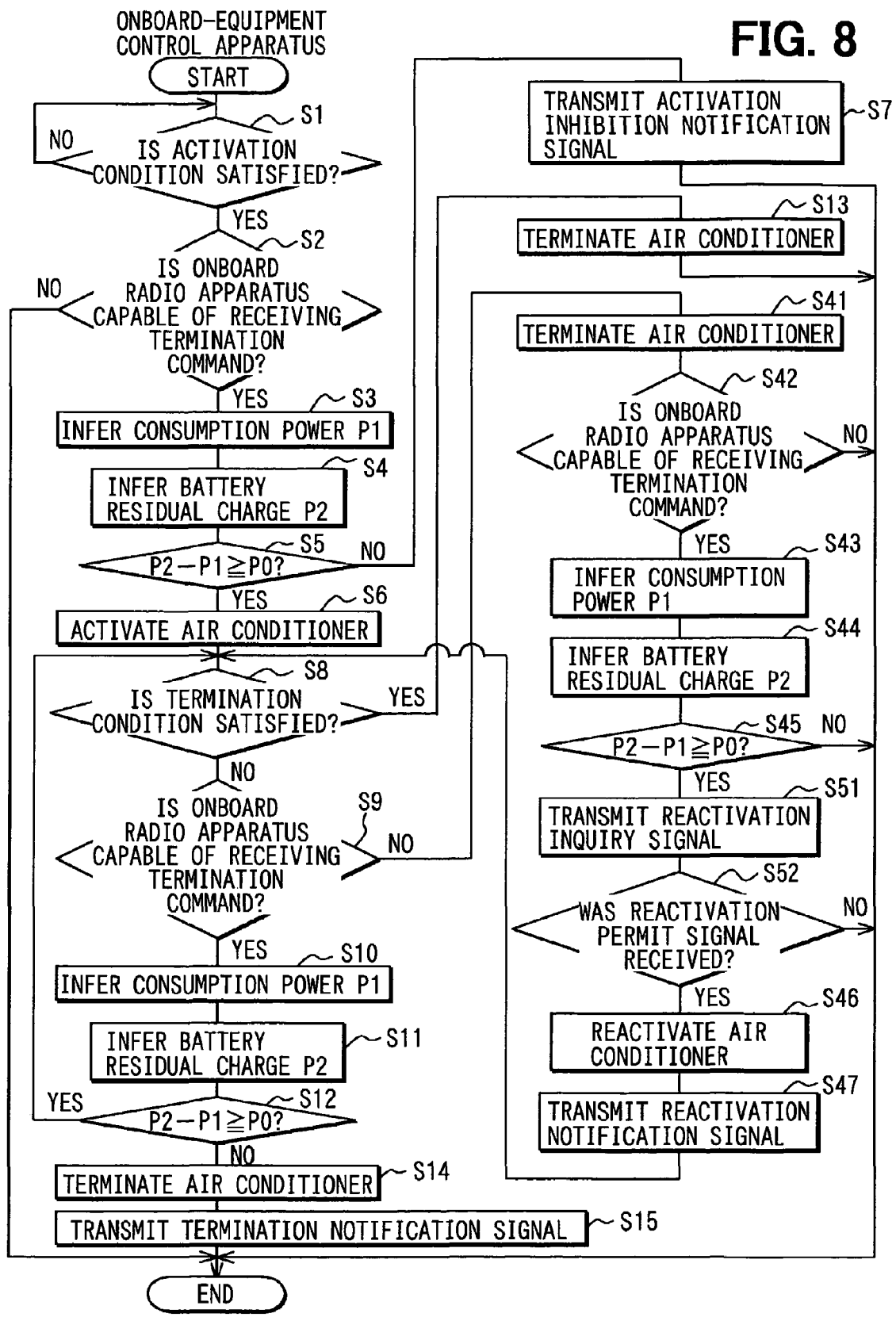
FIG. 8 shows a flowchart representing processing carried out by an onboard-equipment control apparatus employed in an onboard-equipment control system according to a fifth embodiment of the present invention as a counterpart of the flowchart shown in FIG. 2.

Next, a fifth embodiment of the present invention is explained by referring to a flowchart shown in FIG. 8. It is to be noted that components identical with their respective counterparts employed in the fourth embodiment are not explained again. That is, only differences between the fourth and fifth embodiments are described.

In the case of the fifth embodiment, when the difference between the inferred battery residual electric charge P2 and the inferred power consumption P1 is found at least equal to the predetermined value P0, that is, when the determination result produced at Step S45 is YES, the flow of the processing goes on to Step S51 at which the control unit 2 executes control to transmit a reactivation inquiry signal from the onboard radio apparatus 3 to the cellular phone 15. Then, the flow of the processing goes on to Step S52 to determine whether or not the onboard radio apparatus 3 has received a reactivation permit signal from the cellular phone 15. When the onboard radio apparatus 3 has received a reactivation permit signal from the cellular phone 15, that is, when the determination result produced at Step S52 is YES, the flow of the processing goes on to Step S46 at which the control unit 2 executes control to reactivate the air conditioner 13. In this case, much like the fourth embodiment described above, when the state of the cellular phone 15 being incapable of transmitting a command to terminate the operation of the air conditioner 13 to the onboard radio apparatus 3 is taken as a condition for termination of the operation of the air conditioner 13 as is the case of the fourth embodiment explained earlier, however, a recovery from the state of the cellular phone 15 being incapable of transmitting a command to terminate the operation of the air conditioner 13 to the onboard radio apparatus 3 to the state of the cellular phone 15 being capable of transmitting a command to terminate the operation of the air conditioner 13 to the onboard radio apparatus 3 can also be taken as a condition for reactivating the air conditioner 13.

As described above, in accordance with the fifth embodiment, the onboard-equipment control apparatus 1 is implemented as a configuration in which, after the onboard-equipment control apparatus 1 executes control to terminate the operation of the air conditioner 13 upon detection of the fact that the onboard radio apparatus 3 is no longer capable of receiving a command to terminate the operation of the air conditioner 13 from the cellular phone 15, the onboard-equipment control apparatus 1 executes control to reactivate the air conditioner 13 when the state in which the onboard radio apparatus 3 is not capable of receiving a command to terminate the operation of the air conditioner 13 from the cellular phone 15 is returned to the state in which the onboard radio apparatus 3 is capable of receiving a command to terminate the operation of the air conditioner 13 from the cellular phone 15 only when the onboard radio apparatus 3 receives a reactivation permit signal from the cellular phone 15. Thus, the stopped air conditioner 13 can be restored to a state prior to the termination only when the user allows the air conditioner 13 to be reactivated.

In addition, in the configuration described above, after the onboard-equipment control apparatus 1 executes control to terminate the operation of the air conditioner 13 upon detection of the fact that the cellular phone 15 is no longer capable of transmitting a command to terminate the operation of the air conditioner 13 to the onboard radio apparatus 3, the onboard-equipment control apparatus 1 also executes control to reactivate the air conditioner 13 when the state in which the cellular phone 15 is not capable of transmitting a command to terminate the operation of the air conditioner 13 to the onboard radio apparatus 3 is returned to the state in which the cellular phone 15 is capable of transmitting a command to terminate the operation of the air conditioner 13 to the onboard radio apparatus 3 only when the onboard radio apparatus 3 receives a reactivation permit signal from the cellular phone 15. Thus, the stopped air conditioner 13 can be restored to a state prior to the termination only when the user allows the air conditioner 13 to be reactivated.

Sixth Embodiment

Figure 9:
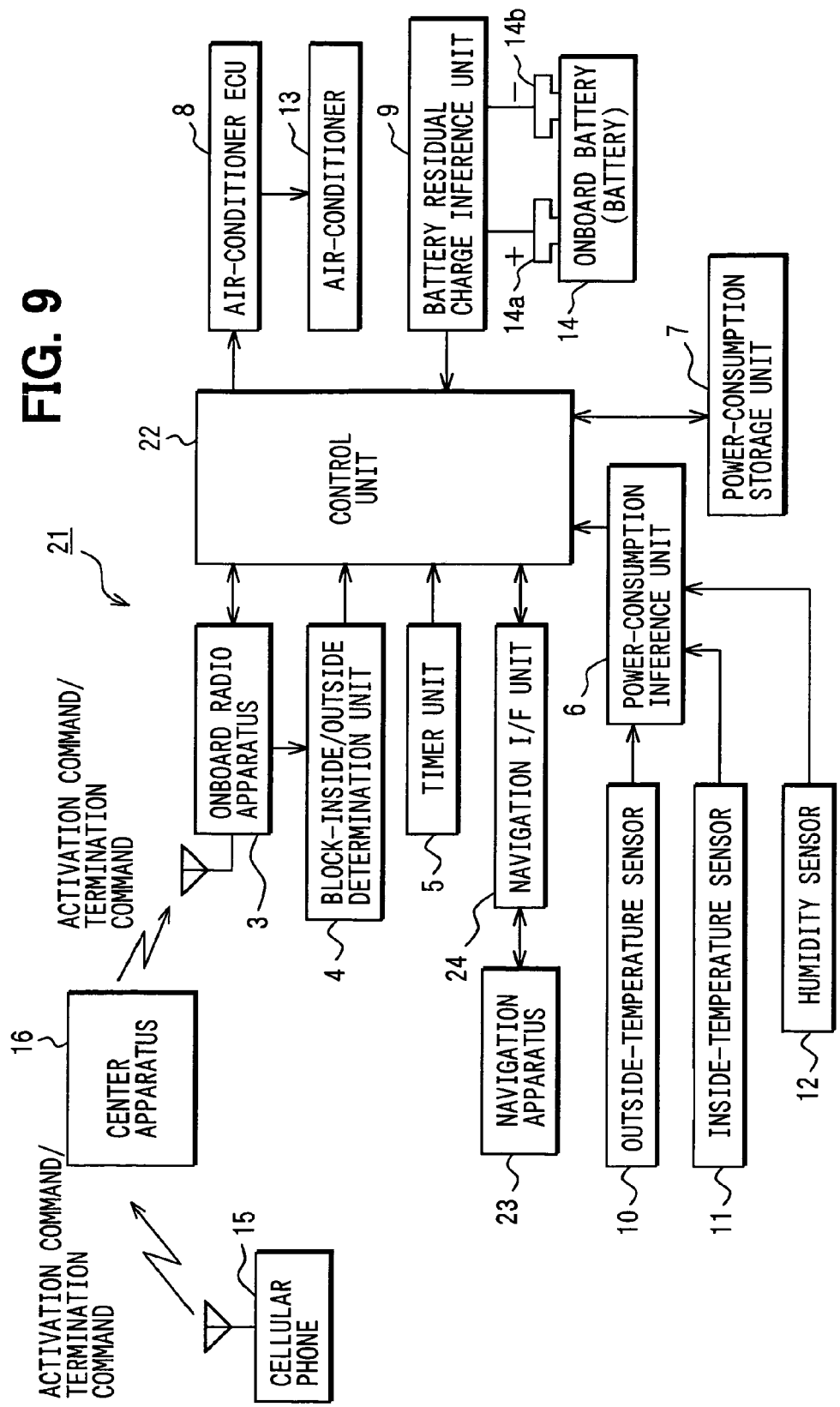
FIG. 9 is a functional block diagram showing the configuration of an onboard-equipment control system according to a sixth embodiment of the present invention.
Figure 10:
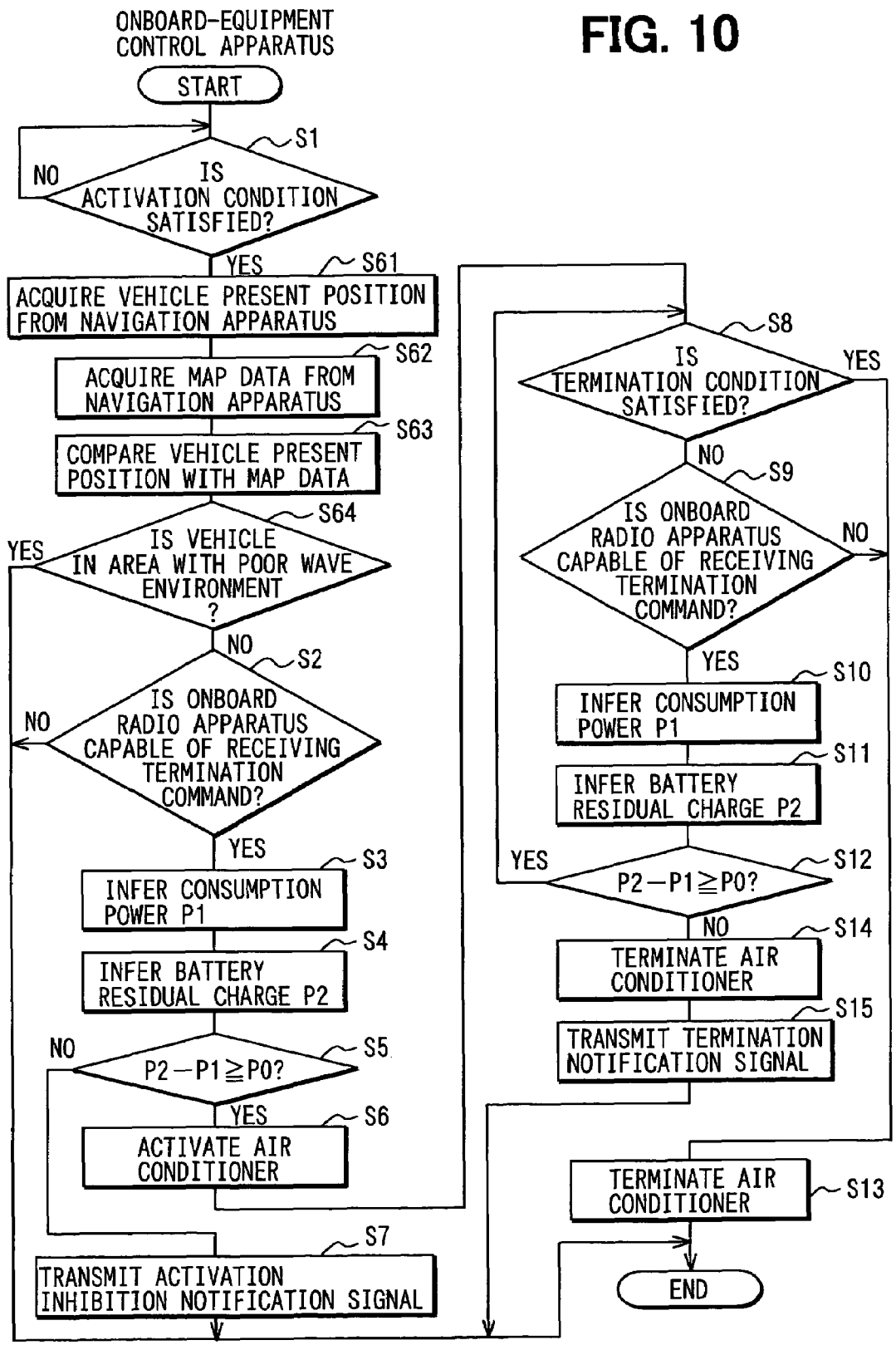
FIG. 10 shows a flowchart representing processing carried out by an onboard-equipment control apparatus employed in the onboard-equipment control system according to the sixth embodiment of the present invention as a counterpart of the flowchart shown in FIG. 2.

Next, a sixth embodiment of the present invention is explained by referring to FIGS. 9 and 10. FIG. 9 is a functional block diagram showing the configuration of the onboard-equipment control system provided by the sixth embodiment. FIG. 10 shows a flowchart representing processing carried out by an onboard-equipment control apparatus 21 shown in FIG. 9. It is to be noted that components identical with their respective counterparts employed in the first embodiment are not explained again. That is, only differences between the first and sixth embodiments are described.

In the configuration of the sixth embodiment, a control unit 22 employed in the onboard-equipment control apparatus 21 receives the present position of the vehicle and map data, which are transmitted by a navigation apparatus 23 by way of a navigation I/F unit 24 to the control unit 22. The present position is information acquired by the navigation apparatus 23 and the map data is data used in the navigation apparatus 23. The map data used in the navigation apparatus 23 includes information as to whether or not the vehicle is located in an area having a poor environment for electric waves.

As the onboard-equipment control apparatus 21 detects satisfaction of the condition for activation of the air conditioner 13, that is, as the determination result produced at Step S1 is YES, the flow of the processing goes on to Step S61 at which the control unit 22 acquires the present position of the vehicle from the navigation apparatus 23. Then, at next Step S62, the control unit 22 acquires map data also from the navigation apparatus 23. Subsequently, at next Step S63, the control unit 22 compares the present position with the map data. Then, at next Step S64, the control unit 22 determines whether or not the vehicle is located in an area having a poor environment for electric waves.

When the control unit 22 determines that the vehicle is not located in an area having a poor environment for electric waves, that is, when the determination result produced at Step S64 is NO, the processes of Step S2 and the subsequent steps are carried out in the same way as the first embodiment. When the control unit 22 determines that the vehicle is located in an area having a poor environment for electric waves, that is, when the determination result produced at Step S64 is YES, on the other hand, the execution of the processing is ended without activating the air conditioner 13.

As described above, in accordance with the sixth embodiment, the onboard-equipment control apparatus 21 is implemented as a configuration in which the control unit 22 compares the present position acquired from the navigation apparatus 23 with the map data also acquired from the navigation apparatus 23 to determine whether or not the vehicle is located in an area having a poor environment for electric waves and, when the control unit 22 determines that the vehicle is located in an area having a poor environment for electric waves, the control unit 22 executes control to inhibit activation of the air conditioner 13 even after the condition for activation of the air conditioner 13 is satisfied. Thus, since the activation of the air conditioner 13 is forcibly inhibited when the vehicle is located in an area having a poor environment for electric waves, much like the first embodiment described earlier, the onboard battery 14 can be prevented in advance from running out of accumulated electric charge required for operating the activated air conditioner 13 thereafter. As a result, the user can be prevented in advance from being put in a difficult situation.

Seventh Embodiment

Figure 11:
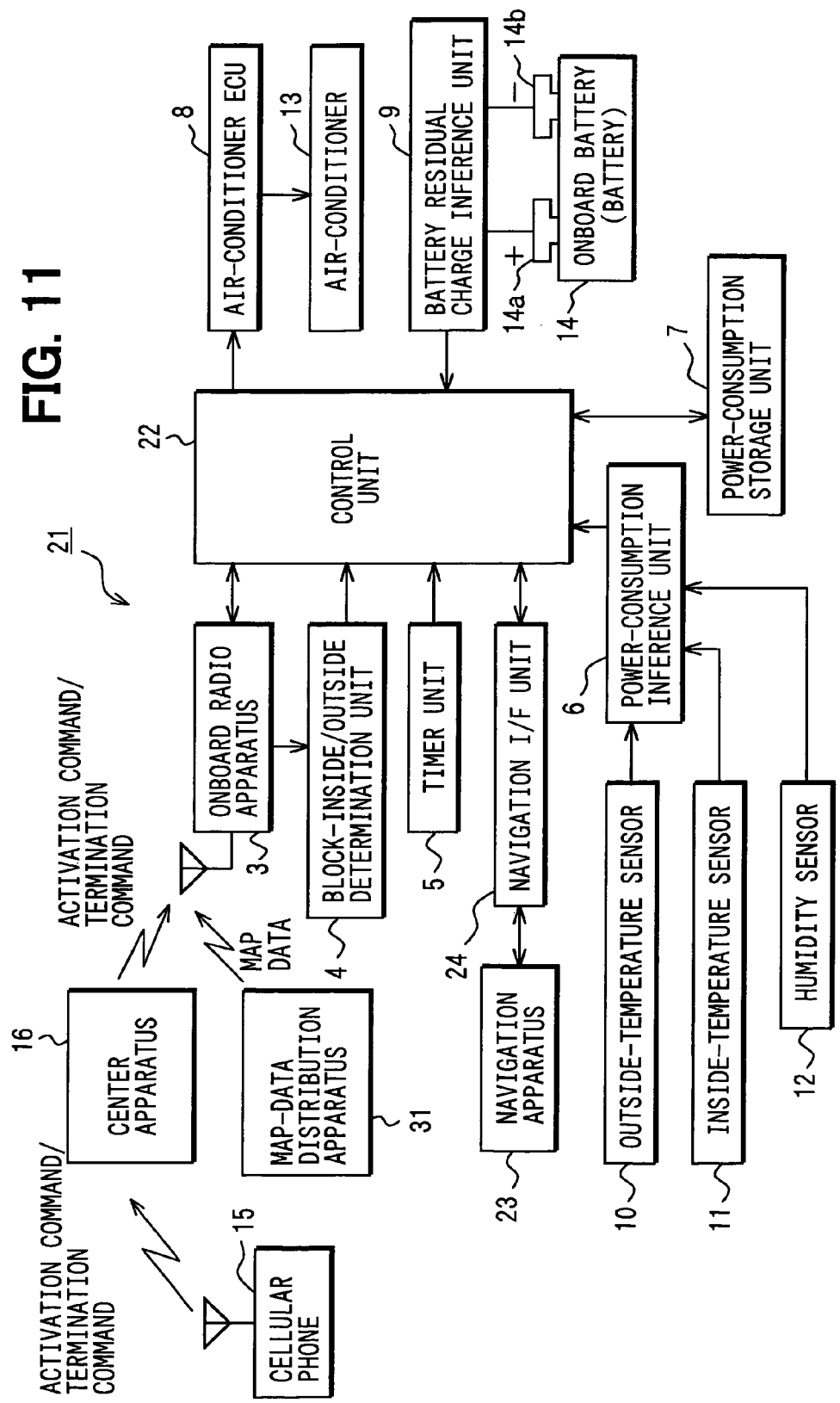
FIG. 11 is a functional block diagram showing the configuration of an onboard-equipment control system according to a seventh embodiment of the present invention.
Figure 12:
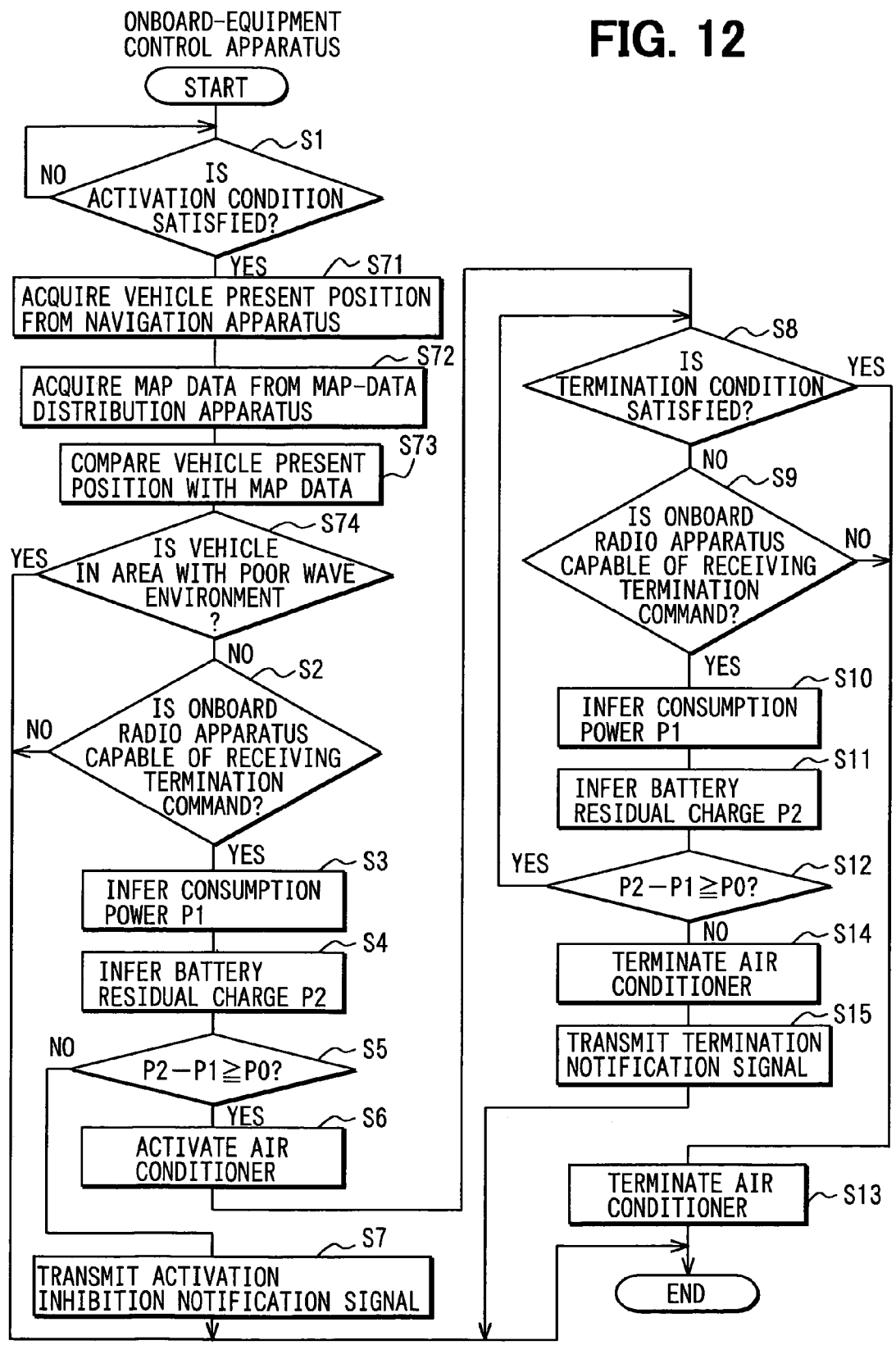
FIG. 12 shows a flowchart representing processing carried out by an onboard-equipment control apparatus employed in the onboard-equipment control system according to the seventh embodiment of the present invention as a counterpart of the flowchart shown in FIG. 2.

Next, a seventh embodiment of the present invention is explained by referring to FIGS. 11 and 12. FIG. 11 is a functional block diagram showing the configuration of an onboard-equipment control system provided by the seventh embodiment. FIG. 12 shows a flowchart representing processing carried out by an onboard-equipment control apparatus 21 employed in the onboard-equipment control system shown in FIG. 11. It is to be noted that components identical with their respective counterparts employed in the sixth embodiment are not explained again. That is, only differences between the sixth and seventh embodiments are described.

In the configuration of the seventh embodiment, a control unit 22 employed in the onboard-equipment control apparatus 21 receives the present position transmitted by a navigation apparatus 23 by way of a navigation I/F unit 24 to the control unit 22 as the present position of the vehicle and also receives map data distributed by a map-data distribution apparatus 31 by way of a hand-phone network. The map data distributed by the map-data distribution apparatus 31 to the onboard radio apparatus 3 by way of a hand-phone network also includes information as to whether or not the vehicle is located in an area having a poor environment for electric waves.

As the control unit 22 employed in the onboard-equipment control apparatus 21 detects satisfaction of the condition for activation of the air conditioner 13, that is, as the determination result produced at Step S1 is YES, the flow of the processing goes on to Step S71 at which the control unit 22 acquires the present position of the vehicle from the navigation apparatus 23. Then, at next Step S72, the control unit 22 acquires map data from the map-data distribution apparatus 31. Subsequently, at next Step S73, the control unit 22 compares the present position with the map data. Then, at next Step S74, the control unit 22 determines whether or not the vehicle is located in an area having a poor environment for electric waves.

When the control unit 22 determines that the vehicle is not located in an area having a poor environment for electric waves, that is, when the determination result produced at Step S74 is NO, the processes of Step S2 and the subsequent steps are carried out in the same way as the first embodiment. When the control unit 22 determines that the vehicle is located in an area having a poor environment for electric waves, that is, when the determination result produced at Step S74 is YES, on the other hand, the execution of the processing is ended without activating the air conditioner 13.

As described above, in accordance with the seventh embodiment, the onboard-equipment control apparatus 21 is implemented as a configuration in which the control unit 22 compares the present position acquired from the navigation apparatus 23 with the map data acquired from the map-data distribution apparatus 31 to determine whether or not the vehicle is located in an area having a poor environment for electric waves and, when the control unit 22 determines that the vehicle is located in an area having a poor environment for electric waves, the control unit 22 executes control to inhibit activation of the air conditioner 13 even after the condition for activation of the air conditioner 13 is satisfied. Thus, since the activation of the air conditioner 13 is forcibly inhibited when the vehicle is located in an area having a poor environment for electric waves, much like the first embodiment described earlier, the onboard battery 14 can be prevented in advance from running out of accumulated electric charge required for operating the activated air conditioner 13 thereafter. As a result, the user can be prevented in advance from being put in a difficult situation.

Other Embodiments

The present invention is by no means limited to the embodiments described above and can be modified or extended as follows.

The present invention can be implemented as a configuration in which the condition for activation of the air conditioner is considered to be satisfied when a temperature of air inside the vehicle compartment of the vehicle exceeds a predetermined upper limit and the condition for termination of the operation of the air conditioner is considered to be satisfied when a temperature of air inside the vehicle compartment of the vehicle goes below a predetermined lower limit.

The present invention is by no means limited to a configuration in which a command to activate the air conditioner and a command to terminate the operation of the air conditioner are received from a cellular phone. For example, the present invention can have a configuration in which a command to activate the air conditioner and a command to terminate the operation of the air conditioner are received from another mobile terminal such as a portable information terminal or from a stationary terminal installed at a home.

The third embodiment can also have a configuration in which, when the center apparatus becomes capable of communicating with the cellular phone (that is, when a state of being incapable of communicating with the cellular phone has been returned to a state of being capable of communicating with the cellular phone) after a command to forcibly terminate the operation of the air conditioner has been transmitted to the onboard-equipment control apparatus, the center apparatus transmits a reactivation command for reactivating the air conditioner to the onboard-equipment control apparatus. Receiving the reactivation command to reactivate the air conditioner from the center apparatus, the onboard-equipment control apparatus reactivates the air conditioner.

Any of the first to seventh embodiments can be combined. That is, in such a combination, upon detection of the fact that the onboard radio apparatus is not capable of receiving a command to terminate the operation of the air conditioner from the cellular phone, the fact that the cellular phone is not capable of transmitting a command to terminate the operation of the air conditioner to the onboard radio apparatus or the fact that the center apparatus has transmitted a command to forcibly terminate the operation of the air conditioner to the onboard radio apparatus while the air conditioner is operating, the operation of the air conditioner is forcibly terminated even before the condition for termination of the operation of the air conditioner is satisfied.

In addition, the present invention can be implemented as a configuration in which, upon detection of the fact that the onboard radio apparatus is not capable of receiving a command to terminate the operation of the air conditioner from the cellular phone, the fact that the cellular phone is not capable of transmitting a command to terminate the operation of the air conditioner to the onboard radio apparatus, the fact that the center apparatus has transmitted a command to forcibly terminate the operation of the air conditioner to the onboard radio apparatus or the fact that a result of comparing the present position of the vehicle with map data indicates that the vehicle is located in an area with a poor environment for electric waves, the activation of the air conditioner is forcibly inhibited even after the condition for activation of the air conditioner has been satisfied.

Furthermore, the present invention can be implemented as a configuration in which, upon detection of the fact that a state of the onboard radio apparatus being incapable of receiving a command to terminate the operation of the air conditioner from the cellular phone has been returned to a state of the onboard radio apparatus being capable of receiving a command to terminate the operation of the air conditioner from the cellular phone after the activation of the air conditioner is inhibited because the onboard radio apparatus is not capable of receiving a command to terminate the operation of the air conditioner from the cellular phone, the inhibited-activation state of the air conditioner is terminated. On the top of that, the present invention can be implemented as a configuration in which, upon detection of the fact that a state of the cellular phone being incapable of transmitting a command to terminate the operation of the air conditioner to the onboard radio apparatus has been returned to a state of the cellular phone being capable of transmitting a command to terminate the operation of the air conditioner to the onboard radio apparatus after the activation of the air conditioner is inhibited because the onboard radio apparatus is not capable of receiving a command to terminate the operation of the air conditioner from the cellular phone, the inhibited-activation state of the air conditioner is terminated.

What is claimed is:

1. An onboard-equipment control apparatus comprising:
    an onboard-radio apparatus configured to receive a command to terminate the operation of an onboard apparatus activated by using power supplied by an onboard battery as operation-driving power from a remote control apparatus transmitting the command to terminate the operation of the onboard apparatus by way of a radio communication network; and
    a control unit configured to
        take at least reception of the command to terminate the operation of the onboard apparatus by the onboard-radio apparatus from the remote control apparatus as one of conditions for termination of the operation of the onboard apparatus and to terminate the operation of the onboard apparatus when any of the conditions for termination of the operation of the onboard apparatus is satisfied while the onboard apparatus is in operation,
        upon detection that either the onboard-radio apparatus is no longer capable of receiving the command to terminate the operation of the onboard apparatus from the remote control apparatus or the remote control apparatus is no longer capable of transmitting the command to terminate the operation of the onboard apparatus to the onboard-radio apparatus while the onboard apparatus is in operation, execute control to terminate the operation of the onboard apparatus even before any of the conditions for termination of the operation of the onboard apparatus is satisfied, wherein
        the command to terminate is received to set a termination time to terminate operation of the onboard apparatus, and operation of the onboard apparatus is terminated before the termination time is reached when one of the command to terminate is determined to not be receivable and the remote control apparatus is determined not to be capable of transmitting the command to terminate.

2. An onboard-equipment control apparatus comprising:
    an onboard-radio apparatus configured to receive a command to terminate the operation of an onboard apparatus activated by using power supplied by an onboard battery as operation-driving power from a remote control apparatus transmitting the command to terminate the operation of the onboard apparatus by way of a radio communication network; and
    a control unit configured to
        activate the onboard apparatus when a condition for activation of the onboard apparatus is satisfied, to take at least reception of the command to terminate the operation of the onboard apparatus by the onboard-radio apparatus from the remote control apparatus as one of conditions for termination of the operation of the onboard apparatus, and to terminate the operation of the onboard apparatus when any of the conditions for termination of the operation of the onboard apparatus is satisfied while the onboard apparatus is in operation,
        upon detection that either the onboard-radio apparatus is no longer capable of receiving the command to terminate the operation of the onboard apparatus from the remote control apparatus or the remote control apparatus is no longer capable of transmitting the command to terminate the operation of the onboard apparatus to the onboard-radio apparatus, execute control to inhibit activation of the onboard apparatus even after the condition for activation of the onboard apparatus has been satisfied, wherein
        a command to activate is received to set an activation time to activate operation of the onboard apparatus, and operation of the onboard apparatus is inhibited from being activated when the activation time is reached when one of:
            the command to terminate is determined not to be receivable; and
            the remote control apparatus is determined not to be capable of transmitting the command to terminate.

3. An onboard-equipment control apparatus according to claim 1, wherein
    the control unit determines that the onboard-radio apparatus is no longer capable of receiving the command to terminate the operation of the onboard apparatus from the remote control apparatus when the number of events detected per time unit as events in each of which the level of a reception electrical field at the onboard-radio apparatus is lower than a predetermined level reaches a predetermined event count.

4. An onboard-equipment control apparatus according to claim 1, wherein
    the control unit determines that the onboard-radio apparatus is no longer capable of receiving the command to terminate the operation of the onboard apparatus from the remote control apparatus when an instance in which the level of a reception electrical field at the onboard-radio apparatus is lower than a predetermined level has been continuing for a predetermined period of time.

5. An onboard-equipment control apparatus according to claim 1, wherein
the control unit determines that the onboard-radio apparatus is no longer capable of receiving the command to terminate the operation of the onboard apparatus from the remote control apparatus when a failure of the onboard-radio apparatus is detected.

6. An onboard-equipment control apparatus according to claim 1, wherein
the control unit determines that the remote control apparatus is no longer capable of transmitting the command to terminate the operation of the onboard apparatus to the onboard-radio apparatus when the number of events detected per time unit as events in each of which the level of a reception electrical field at the remote control apparatus is lower than a predetermined level reaches a predetermined event count.

7. An onboard-equipment control apparatus according to claim 1, wherein
the control unit determines that the remote control apparatus is no longer capable of transmitting the command to terminate the operation of the onboard apparatus to the onboard-radio apparatus when an instance in which the level of a reception electrical field at the remote control apparatus is lower than a predetermined level has been continuing for a predetermined period of time.

8. An onboard-equipment control apparatus according to claim 1, further comprising:
a battery residual charge inference unit configured to infer the amount of residual electric charge left in the onboard battery; and
a power-consumption inference unit configured to infer a power consumption representing the amount of power, which is consumed by the onboard apparatus on the assumption that the operation of the onboard apparatus is terminated when a condition for termination of the operation of the onboard apparatus is satisfied,
wherein said control unit executes control to terminate the operation of the onboard apparatus even before the condition for termination of the operation of the onboard apparatus is satisfied when a difference between a residual electric charge amount inferred by the battery residual electric charge inference unit as the amount of residual electric charge left in the onboard battery and the power consumption inferred by the power-consumption inference unit is found not greater than a predetermined value, while the onboard apparatus is in operation.

9. An onboard-equipment control apparatus according to claim 8, wherein
the control unit executes control to transmit a termination notification signal from the onboard-radio apparatus to the remote control apparatus by way of a radio communication network after terminating the operation of the onboard apparatus as a signal informing the remote control apparatus that the operation of the onboard apparatus has been terminated.

10. An onboard-equipment control apparatus according to claim 2, further comprising:
a battery residual charge inference configured to infer the amount of residual electric charge left in the onboard battery; and
a power-consumption inference configured to infer a power consumption representing the amount of power, which is consumed by the onboard apparatus on the assumption that the operation of the onboard apparatus is terminated when a condition for termination of the operation of the onboard apparatus is satisfied,
wherein said control unit executes control to inhibit activation of the onboard apparatus even after a condition for activation of the onboard apparatus has been satisfied when a difference between a residual electric charge amount inferred by the battery residual electric charge inference unit as the amount of residual electric charge left in the onboard battery and the power consumption inferred by the power-consumption inference unit is found not greater than a predetermined value.

11. An onboard-equipment control apparatus according to claim 10, wherein,
after execution of control to inhibit activation of the onboard apparatus, the control unit executes control to transmit an activation-inhibition notification signal from the onboard-radio apparatus to the remote control apparatus by way of a radio communication network as a signal informing the remote control apparatus that the activation of the onboard apparatus has been inhibited.

12. An onboard-equipment control apparatus according to claim 10, wherein
the control unit executes control to activate the onboard apparatus when a difference between a residual electric charge amount inferred by the battery residual electric charge inference unit as the amount of residual electric charge left in the onboard battery and a power consumption inferred by the power-consumption inference unit is found at least equal to the predetermined value after a condition for activation of the onboard apparatus is satisfied.

13. An onboard-equipment control apparatus according to claim 2, wherein
the control unit compares the present position of a vehicle with map data in order to determine whether or not the vehicle is located in an area with a poor environment for electric waves and, when the vehicle is located in an area with a poor environment for electric waves, the control unit executes control to inhibit activation of the onboard apparatus even after a condition for activation of the onboard apparatus is satisfied.

14. An onboard-equipment control apparatus according to claim 13, wherein
the control unit compares position information received from a navigation apparatus as the present position of the vehicle with map data used in the navigation apparatus in order to determine whether or not the vehicle is located in an area with a poor environment for electric waves.

15. An onboard-equipment control apparatus according to claim 13, wherein
the control unit compares position information received from the navigation apparatus as the present position of the vehicle with map data supplied from a map-data distribution apparatus by way of a radio communication network in order to determine whether or not the vehicle is located in an area with a poor environment for electric waves.

16. An onboard-equipment control apparatus according to claim 1, wherein,
after the control unit executes control to stop the operation of the onboard apparatus upon detection of the fact that the onboard-radio apparatus is no longer capable of receiving a command to terminate the operation of the onboard apparatus from the remote control apparatus, the control unit executes control to resume the operation of the stopped onboard apparatus upon detection of a recovery of the onboard-radio apparatus from a state of being incapable of receiving a command to terminate the operation of the onboard apparatus from the remote control apparatus to a state of being again capable of receiving a command to terminate the operation of the onboard apparatus from the remote control apparatus.

17. An onboard-equipment control apparatus according to claim 1, wherein,
after the control unit executes control to stop the operation of the onboard apparatus upon detection of the fact that that the remote control apparatus is no longer capable of transmitting a command to terminate the operation of the onboard apparatus to the onboard-radio apparatus, the control unit executes control to resume the operation of the stopped onboard apparatus upon detection of a recovery of the remote control apparatus from a state of being incapable of transmitting a command to terminate the operation of the onboard apparatus to the onboard-radio apparatus to a state of being again capable of transmitting a command to terminate the operation of the onboard apparatus to the onboard-radio apparatus.

18. An onboard-equipment control apparatus according to claim 16, wherein
the control unit executes control to reactivate the stopped onboard apparatus when a predetermined condition is satisfied.

19. An onboard-equipment control apparatus according to claim 16, wherein,
after execution of control to resume the operation of the stopped onboard apparatus, the control unit executes control to transmit a resumption notification signal to the remote control apparatus from the onboard-radio apparatus by way of a radio communication network as a signal informing the remote control apparatus that the operation of the stopped onboard apparatus has been resumed.

20. An onboard-equipment control apparatus according to claim 2, wherein,
after the control unit executes control to inhibit activation of the onboard apparatus upon detection of the fact that the onboard-radio apparatus is no longer capable of receiving a command to terminate the operation of the onboard apparatus from the remote control apparatus, the control unit executes control to terminate an inhibited-activation state of the onboard apparatus upon detection of a recovery of the onboard-radio apparatus from a state of being incapable of receiving a command to terminate the operation of the onboard apparatus from the remote control apparatus to a state of being again capable of receiving a command to terminate the operation of the onboard apparatus from the remote control apparatus.

21. An onboard-equipment control apparatus according to claim 2, wherein,
after the control unit executes control to inhibit activation of the onboard apparatus upon detection of the fact that the remote control apparatus is no longer capable of transmitting a command to terminate the operation of the onboard apparatus to the onboard-radio apparatus, the control unit executes control to terminate an inhibited-activation state of the onboard apparatus upon detection of a recovery of the remote control apparatus from a state of being incapable of transmitting a command to terminate the operation of the onboard apparatus to the onboard-radio apparatus to a state of being again capable of transmitting a command to terminate the operation of the onboard apparatus to the onboard-radio apparatus.

22. An onboard-equipment control apparatus according to claim 20, wherein
the control unit executes control to terminate the inhibited-activation state of the onboard apparatus when a predetermined condition is satisfied.

23. An onboard-equipment control apparatus according to claim 20, wherein,
after execution of control to terminate the inhibited-activation state of the onboard apparatus, the control unit executes control to transmit an activation-inhibition termination notification signal to the remote control apparatus from the onboard-radio apparatus by way of a radio communication network as a signal informing the remote control apparatus that the inhibited-activation state of the onboard apparatus has been ended.

24. An onboard-equipment control apparatus according to claim 2, wherein
the control unit determines that the onboard-radio apparatus is no longer capable of receiving the command to terminate the operation of the onboard apparatus from the remote control apparatus when the number of events detected per time unit as events in each of which the level of a reception electrical field at the onboard-radio apparatus is lower than a predetermined level reaches a predetermined event count.

25. An onboard-equipment control apparatus according to claim 2, wherein
the control unit determines that the onboard-radio apparatus is no longer capable of receiving the command to terminate the operation of the onboard apparatus from the remote control apparatus when an instance in which the level of a reception electrical field at the onboard-radio apparatus is lower than a predetermined level has been continuing for a predetermined period of time.

26. An onboard-equipment control apparatus according to claim 2, wherein
the control unit determines that the onboard-radio apparatus is no longer capable of receiving the command to terminate the operation of the onboard apparatus from the remote control apparatus when a failure of the onboard-radio apparatus is detected.

27. An onboard-equipment control apparatus according to claim 2, wherein
the control unit determines that the remote control apparatus is no longer capable of transmitting the command to terminate the operation of the onboard apparatus to the onboard-radio apparatus when the number of events detected per time unit as events in each of which the level of a reception electrical field at the remote control apparatus is lower than a predetermined level reaches a predetermined event count.

28. An onboard-equipment control apparatus according to claim 2, wherein
the control unit determines that the remote control apparatus is no longer capable of transmitting the command to terminate the operation of the onboard apparatus to the onboard-radio apparatus when an instance in which the level of a reception electrical field at the remote control apparatus is lower than a predetermined level has been continuing for a predetermined period of time.

29. An onboard-equipment control apparatus according to claim 2, further comprising:
  a battery residual charge inference unit configured to infer the amount of residual electric charge left in the onboard battery; and
  a power-consumption inference unit configured to infer a power consumption representing the amount of power, which is consumed by the onboard apparatus on the assumption that the operation of the onboard apparatus is terminated when a condition for termination of the operation of the onboard apparatus is satisfied,
  wherein said control unit executes control to terminate the operation of the onboard apparatus even before the condition for termination of the operation of the onboard apparatus is satisfied when a difference between a residual electric charge amount inferred by the battery residual electric charge inference unit as the amount of residual electric charge left in the onboard battery and the power consumption inferred by the power-consumption inference unit is found not greater than a predetermined value, while the onboard apparatus is in operation.

30. An onboard-equipment control apparatus according to claim 2, wherein,
  after the control unit executes control to stop the operation of the onboard apparatus upon detection of the fact that the onboard-radio apparatus is no longer capable of receiving a command to terminate the operation of the onboard apparatus from the remote control apparatus, the control unit executes control to resume the operation of the stopped onboard apparatus upon detection of a recovery of the onboard-radio apparatus from a state of being incapable of receiving a command to terminate the operation of the onboard apparatus from the remote control apparatus to a state of being again capable of receiving a command to terminate the operation of the onboard apparatus from the remote control apparatus.

31. An onboard-equipment control apparatus according to claim 2, wherein,
  after the control unit executes control to stop the operation of the onboard apparatus upon detection of the fact that that the remote control apparatus is no longer capable of transmitting a command to terminate the operation of the onboard apparatus to the onboard-radio apparatus, the control unit executes control to resume the operation of the stopped onboard apparatus upon detection of a recovery of the remote control apparatus from a state of being incapable of transmitting a command to terminate the operation of the onboard apparatus to the onboard-radio apparatus to a state of being again capable of transmitting a command to terminate the operation of the onboard apparatus to the onboard-radio apparatus.

32. An on-board equipment control apparatus according to claim 1, wherein the onboard apparatus includes an air-conditioner.

33. An on-board equipment control apparatus according to claim 2, wherein the onboard apparatus includes an air-conditioner.

* * * * *